US008527844B2

(12) United States Patent
Kondou et al.

(10) Patent No.: US 8,527,844 B2
(45) Date of Patent: Sep. 3, 2013

(54) PHASE SYNCHRONIZATION APPARATUS, PHASE SYNCHRONIZATION METHOD AND PHASE SYNCHRONIZATION PROGRAM

(75) Inventors: Keitarou Kondou, Tokyo (JP); Makoto Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 216 days.

(21) Appl. No.: 13/067,312

(22) Filed: May 24, 2011

(65) Prior Publication Data

US 2011/0314357 A1    Dec. 22, 2011

(30) Foreign Application Priority Data

May 31, 2010   (JP) ................................ P2010-125235

(51) Int. Cl.
*H03M 13/00*    (2006.01)
(52) U.S. Cl.
USPC .......................................................... 714/775
(58) Field of Classification Search
USPC ................. 714/775, 798, 699, 700, 707, 746;
375/316, 54; 327/141
See application file for complete search history.

(56) References Cited

U.S. PATENT DOCUMENTS

| 4,989,073 | A | * | 1/1991 | Wagner | 348/498 |
| 5,309,484 | A | | 5/1994 | McLane et al. | |
| 6,920,280 | B2 | * | 7/2005 | Okamoto | 386/207 |
| 7,012,862 | B2 | * | 3/2006 | Hiratsuka | 369/44.34 |
| 8,361,054 | B2 | * | 1/2013 | Ducharme et al. | 604/508 |
| 8,369,455 | B2 | * | 2/2013 | Hasegawa et al. | 375/316 |
| 2010/0283909 | A1 | * | 11/2010 | Belotserkovsky | 348/726 |
| 2010/0283910 | A1 | * | 11/2010 | Belotserkovsky | 348/726 |
| 2010/0283911 | A1 | * | 11/2010 | Belotserkovsky | 348/726 |

FOREIGN PATENT DOCUMENTS

| JP | 2006-338726 A | 12/2006 |
| JP | 2007-026596 A | 1/2007 |

OTHER PUBLICATIONS

F. M. Gardner, "Interpolation in Digital Modems—Part I: Fundamentals," IEEE, Transactions on Communications, vol. 41, No. 3, Mar. 1993, pp. 501-507.

Z. N. Wu, et al., "A MMSE Interpolated Timing Recovery Scheme for the Magnetic Recording Channel," IEEE International Conference on Communications #1997, pp. 1625-1629.

* cited by examiner

*Primary Examiner* — Phung M Chung
(74) *Attorney, Agent, or Firm* — Rader, Fishman & Grauer PLLC

(57) ABSTRACT

A phase synchronization apparatus and corresponding method are disclosed. In one example the phase synchronization apparatus may include a sampling section, a phase-error detection section, a first computation section, a second computation section, and an interpolation section. The apparatus and method may also carry out phase synchronization that corrects the phases of received signals sampled at sampling periods asynchronous with symbol periods, by carrying out concurrent processing to generate a plurality of received symbols so that the phases can be synchronized at a higher speed.

7 Claims, 14 Drawing Sheets

RELATED ART

PHASE SYNCHRONIZATION APPARATUS, PHASE SYNCHRONIZATION METHOD AND PHASE SYNCHRONIZATION PROGRAM

BACKGROUND

The present technology relates to a phase synchronization apparatus, a phase synchronization method and a phase synchronization program. More specifically, the present technology relates to a phase synchronization apparatus capable of synchronizing a plurality of symbols at a higher speed on the basis of received signals sampled asynchronously with the symbol period by carrying out concurrent processing to generate the symbols and relates to a phase synchronization method adopted by the apparatus as well as a phase synchronization program implementing the method.

FIG. 1 is a block diagram showing a typical configuration of a radio communication system.

As shown in FIG. 1, the radio communication system is configured to include a signal transmitting apparatus 1 and a signal receiving apparatus 2. The signal transmitting apparatus 1 is configured to include a transmitting-side base band block 11, a transmitting-side RF circuit 12 and an antenna 13.

The transmitting-side base band block 11 is configured to include an error-correction coding circuit 21, a header/preamble insertion circuit 22, a modulation circuit 23, a transmitting-side filter 24 and a D/A (Digital/Analog) converter 25. Transmission data to be transmitted is supplied to the transmitting-side base band block 11 employed in the signal transmitting apparatus 1.

The error-correction coding circuit 21 generates parity bits for typically an error correction purpose on the basis of the data being transmitted and adds the parity bits to the data being transmitted in an error correction coding process. The error-correction coding circuit 21 supplies the result of the error correction coding process carried out on the transmission data being transmitted to the header/preamble insertion circuit 22.

The header/preamble insertion circuit 22 inserts a header and/or a preamble into the transmission data received from the error-correction coding circuit 21. The header and/or the preamble include a variety of parameters. The header/preamble insertion circuit 22 supplies the transmission data including the header and/or the preamble to the modulation circuit 23.

The modulation circuit 23 carries out modulation processing such as the QPSK (Quadrature Phase Shift Keying) modulation processing or the BPSK (Binary Phase Shift Keying) modulation processing in order to convert the transmission data received from the header/preamble insertion circuit 22 into a sequence of transmission symbols separated from each other by a period $T_s$. The modulation circuit 23 supplies each of the transmission symbols obtained as a result of the conversion to the transmitting-side filter 24.

The transmitting-side filter 24 carries out a filtering process on the transmission symbols received from the modulation circuit 23 in order to impose limits on the transmission band and supplies transmission symbols obtained as a result of the filtering process to the D/A converter 25.

The D/A converter 25 carries out D/A conversion processing on the transmission symbols received from the transmitting-side filter 24 and supplies an analog base band signal obtained as a result of the D/A conversion processing to the transmitting-side RF circuit 12.

The transmitting-side RF circuit 12 superposes the analog base band signal received from the D/A converter 25 on a carrier having a frequency determined in advance, supplying the analog base band signal and the carrier to the antenna 13 for transmitting the analog base band signal and the carrier to the signal receiving apparatus 2.

The signal receiving apparatus 2 is configured to include an antenna 31, a receiving-side RF circuit 32 and a receiving-side base band block 33. The receiving-side base band block 33 is configured to include an A/D converter 41, a receiving-side filter 42, a phase synchronization circuit 43, a demodulation circuit 44 and an error correction code decoding circuit 45. The antenna 31 receives the RF transmission signal transmitted by the signal transmitting apparatus 1 and supplies the RF signal to the receiving-side RF circuit 32 by way of the antenna 13.

The receiving-side RF circuit 32 converts the RF signal received from the antenna 31 into an analog base band signal and supplies the analog base band signal to the receiving-side base band block 33.

The A/D converter 41 employed in the receiving-side base band block 33 carries out sampling processing on the analog base band signal received from the receiving-side RF circuit 32 at a sampling period $T_p$ asynchronous with a symbol period $T_s$. The A/D converter 41 supplies data obtained as a result of the sampling processing to the receiving-side filter 42 as a received signal.

The receiving-side filter 42 carries out a filtering process on the received signal supplied thereto by the A/D converter 41 and supplies the result of the filtering process to the phase synchronization circuit 43.

The phase synchronization circuit 43 is configured to function as typically an FIR (Finite Impulse Response) filter. The phase synchronization circuit 43 implements symbol synchronization on the basis of the received signal supplied thereto by the receiving-side filter 42. The phase synchronization circuit 43 carries out interpolation processing in order to find received symbols from the received signal and then supplies the received symbols to the demodulation circuit 44.

The demodulation circuit 44 carries out demodulation processing by adoption of a demodulation method corresponding to the modulation method adopted by the signal transmitting apparatus 1 in order to demodulate the received symbols. Typical examples of the demodulation processing are the QPSK demodulation processing and the BPSK demodulation processing. Then, the demodulation circuit 44 supplies received data obtained as a result of the demodulation processing to the error correction code decoding circuit 45.

The error correction code decoding circuit 45 carries out error correction processing on the received data supplied thereto by the demodulation circuit 44 and outputs the received data obtained as a result of the error correction processing to an external data recipient.

The technique adopted by the signal receiving apparatus 2 to implement symbol synchronization is a technique making use of an interpolation FIR filter to find received symbols from received signals obtained as a result of sampling the analog base band signal at a sampling period $T_p$ asynchronous with a symbol period $T_s$ as described above. In this case, the A/D converter 41 carries out a sampling process at a constant clock period. It is to be noted that, as a technique adopted by the signal receiving apparatus 2 to implement symbol synchronization on the receiving side of the radio communication system, there is also a technique in accordance with which the sampling phase of the A/D converter is controlled and the output of the A/D converter is taken as received symbols.

The former technique adopted by the signal receiving apparatus 2 has merits that it is not necessary to control the sampling frequency of the A/D converter 41 and it is possible to eliminate a delay introduced by a phase error feedback.

In addition, the signal receiving apparatus 2 also has a merit that, since the phase synchronization circuit 43 is configured as a digital circuit handling no analog signal, the function of the phase synchronization circuit 43 can be verified by carrying out only digital-circuit verification processing. If the phase synchronization circuit 43 is configured as mixed circuits including analog and digital circuits for example, the characteristic of the analog circuit particularly changes with the temperature so that it is difficult to verify the function of the analog circuit. In the case of this signal receiving apparatus 2, however, the function of the phase synchronization circuit 43 can be verified by adoption of a simpler technique.

The method described above as a method to implement symbol synchronization is also described in documents such as Japanese Patent, Laid-Open No. 2006-338726 (hereinafter referred to as Patent Document 1), Japanese Patent Laid-Open No. 2007-26596 (hereinafter referred to as Patent Document 2) and U.S. Pat. No. 5,309,484.

FIG. 2 is a block diagram showing a typical configuration of the phase synchronization circuit 43 shown in FIG. 1.

As shown in FIG. 2, the phase synchronization circuit 43 is configured to include an interpolation FIR filter 61 and a signal processing circuit 62. The signal processing circuit 62 is configured to include a phase-error detection circuit 71, a loop filter 72 and an NCO (Numerical Control Oscillator) 73. The received signal is supplied by the receiving-side filter 42 to the interpolation FIR filter 61 by way of an input terminal 51.

The interpolation FIR filter 61 carries out interpolation processing by making use of the received signal and a phase offset $\Phi_k$ received from the NCO 73, outputting a received symbol $y_k$ to the demodulation circuit 44 by way of a received-symbol output terminal 52. The interpolation FIR filter 61 also supplies the received symbol $y_k$ to the phase-error detection circuit 71 employed in the signal processing circuit 62.

The NCO 73 also outputs an enable signal $e_k$ to a circuit at the immediately succeeding stage. The immediately succeeding stage makes use of the enable signal $e_k$ for determining whether or not the received symbol $y_k$ is to be processed. The received symbol $y_k$ generated by the interpolation FIR filter 61 can be said to be a candidate for a received symbol.

It is also possible to provide a configuration in which the enable signal $e_k$ is also supplied to the interpolation FIR filter 61. In this case, the interpolation FIR filter 61 carries out the interpolation processing on the received signal only if the value of the enable signal $e_k$ indicates that the interpolation processing is to be carried out.

FIG. 3 is a diagram showing relations between the analog base band signal, the received signals and the received symbols.

A solid line shown in FIG. 3 represents the waveform of the analog base band signal supplied to the A/D converter 41. Each of white circles represents the received signal obtained as a result of the sampling process carried out by the A/D converter 41 on the analog base band signal. The received signals are supplied to the receiving-side filter 42 for carrying out a proper filtering process on the received signals. Each of black circles represents a received symbol. An interval between two adjacent white circles is referred to as a sampling period $T_p$ whereas an interval between two adjacent black circles is referred to as a symbol period $T_s$.

As described above, the interpolation FIR filter 61 carries out the interpolation processing. In the interpolation processing, the phase of the received signal is corrected on the basis of a phase offset $\Phi_k$ found by the NCO 73 and the corrected phase is taken as the phase of a received symbol in inference of the value of the received symbol.

The reader is advised to refer back to FIG. 2. In the signal processing circuit 62, the NCO 73 also outputs the enable signal $e_k$ to the phase-error detection circuit 71. The phase-error detection circuit 71 detects a phase error $d_k$ on the basis of the received symbol $y_k$ output by the interpolation FIR filter 61 and the enable signal $e_k$ output by the NCO 73. The phase-error detection circuit 71 supplies the phase error $d_k$ to the loop filter 72.

For the purpose of stabilizing the feedback loop, the loop filter 72 carries out a filtering process on the sequence of phase errors $d_k$, outputting a phase-error correction value $l_k$ to the NCO 73.

On the basis of the phase-error correction value $l_k$, the NCO 73 computes a phase offset $\Phi_k$ between the received signal and the received symbol, outputting the phase offset $\Phi_k$ to the interpolation FIR filter 61. In addition, the NCO 73 also finds the value of the enable signal $e_k$, outputting the enable signal $e_k$ representing the found value to the phase-error detection circuit 71 and a circuit at the immediately succeeding stage by the way of the enable-signal output terminal 53.

As described above, the phase synchronization circuit 43 carries out feedback control to update the phase offset $\Phi_k$ on the basis of the received symbol $y_k$ so as to establish symbol synchronization. The phase synchronization circuit 43 shown in FIG. 2 functions as the so-called interpolation-type phase-synchronization circuit having a serial configuration for outputting one received symbol $y_k$ and an enable signal $e_k$ at every time k for a received signal which is obtained as one sample.

Floyd M. Gardner, "Interpolation in digital modems-I: Fundamentals," IEEE Trans. Commun., vol 41, pp. 501-507, March 1993 (hereinafter referred to as Non-Patent Document 1) and Zi-Ning Wu and John M. Cioffi, "A MMSE Interpolated Timing Recovery Scheme for the Magnetic Recording Channel," IEEE International Conference on Communications 1977, pp. 1625-1629, 1997 (hereinafter referred to as Non-Patent Document 2) describe representative algorithms used in the phase-synchronization circuit having a serial configuration for processing a received signal for every sampling period $T_p$ in order to output a received symbol. These algorithms are described as follows.

At a time k which is a sampling time where k is a natural number, the interpolation FIR filter 61 shown in FIG. 2 finds a received symbol $y_k$ by making use of a phase offset $\Phi_k$ computed at the immediately preceding time k−1. The phase offset $\Phi_k$ is an offset normalized by making use of the sampling period $T_p$. The phase offset $\Phi_k$ has a value in the following range: $0 \leq \Phi_k < 1$.

The phase-error detection circuit 71 receives the received symbol $y_k$ and the enable signal $e_k$, finding a phase error $d_k$ in accordance with Eq. (1) given below. $\Delta_k$ used in Eq. (1) is expressed by Eq. (2) also given below.

$$d_k = e_k \cdot K_d \cdot \Delta_k \tag{1}$$

$$\Delta_k = k_\tau (y_k \cdot \overline{y'_{k-1}} - \overline{y_k} \cdot y'_{k-1}) \tag{2}$$

In addition, at the time k, if the enable signal $e_k$ is 1, the phase-error detection circuit 71 outputs the phase error $d_k$. If the enable signal $e_k$ is 0, on the other hand, the phase-error detection circuit 71 outputs 0. That is to say, the phase-error detection circuit 71 outputs the phase error $d_k$ or 0 and, at the same time, updates an internal variable $y'_k$ in accordance with Eq. (3) as follows.

$$y'_k = \begin{cases} y_k, & \text{if } e_k = 1 \\ y'_{k-1}, & \text{else} \end{cases} \quad (3)$$

In the above equation, $e_k \in \{0, 1\}$ denotes the enable signal $e_k$ computed at the sampling time (k−1) for the received symbol $y_k$. In addition, reference notation $K_d$ used in Eq. (1) denotes a gain set for the phase-error detection circuit 71 whereas reference notation $k_\tau$ used in Eq. (2) denotes a constant. Reference notation $y_k$ put under reference notation '−' in Eq. (2) denotes the (hard determination value) of the received symbol $y_k$.

The loop filter 72 receives the phase error $d_k$ from the phase-error detection circuit 71 and finds a phase-error correction value $l_k$ from the phase error $d_k$. If the phase synchronization circuit 43 shown in FIG. 2 is configured to function as a second-order feedback system, the phase-error correction value $l_k$ is updated typically in accordance with Eq. (4) given as follows.

$$l_k = \mu\left(K_p d_k + K_I \sum_{i=1}^{k} d_i\right) \quad (4)$$

In Eq. (4), reference notation $K_p$ denotes a coefficient for a proportional term of the loop filter 72 whereas reference notation $K_I$ denotes a coefficient for an integral term of the loop filter 72. Reference notation $\mu$ denotes the ratio $T_s/T_p$ (that is, $\mu \equiv T_s/T_p$) which is the symbol period $T_s$ normalized by the sample period $T_p$. In general, the A/D converter 41 carries out the sampling process in an over-sampling state. Thus, the value of the ratio $\mu$ is a real number not smaller than 1.

The NCO 73 updates the phase offset $\Phi_{k+1}$, which will be used at the time k+1 in the interpolation FIR filter 61, in accordance with Eq. (5) given as follows.

$$\phi_{k+1} = \begin{cases} \phi_k + (\mu - 1) + l_k, & \text{if } \phi_k < 1 \\ \phi_k - 1, & \text{else} \end{cases} \quad (5)$$

In addition, the NCO 73 computes the enable signal $e_{k+1}$ in accordance with Eq. (6) given below. The enable signal $e_{k+1}$ is associated with the received symbol $y_{k+1}$ output by the interpolation FIR filter 61 at the time (k+1). That is to say, if the value of the enable signal $e_{k+1}$ is 1, the received symbol $y_{k+1}$ is handled as a symbol to be processed in a circuit provided at the immediately succeeding stage.

$$e_{k+1} = \begin{cases} 1, & \text{if } \phi_{k+1} < 1 \\ 0, & \text{else} \end{cases} \quad (6)$$

FIG. 4 is a diagram showing a typical configuration of the NCO 73 shown in FIG. 2.

An addition circuit 91 adds (μ−1) received from an input terminal 81 to the phase-error correction value $l_k$ received from an input terminal 82 in order to generate a sum. The expression (μ−1) has a value set for the NCO 73. On the other hand, the loop filter 72 supplies the phase-error correction value $l_k$ by way of the input terminal 82.

A select circuit 92 selects the value 0 if the MSB (most significant bit) of the phase offset $\Phi_k$ stored in a buffer 94 is 1. However, the select circuit 92 selects the sum generated by the addition circuit 91 if the MSB of the phase offset $\Phi_k$ stored in the buffer 94 is 0.

An addition circuit 93 adds the value selected by the select circuit 92 to a value represented by the bit string of the phase offset $\Phi_k$ in order to produce a sum. However, the bit string to be added to the output of the select circuit 92 excludes the most significant bit of the bit string. That is to say, the addition circuit 91, the select circuit 92 and the addition circuit 93 carry out operations represented by Eq. (5).

The sum generated by the addition circuit 93 is stored in the buffer 94 as the phase offset $\Phi_k$. The most significant bit of the bit string of this sum is supplied to an inversion circuit 95. The most significant bit of the bit string of this sum is inverted by the inversion circuit 95 in order to produce the enable signal $e_{k+1}$. The inversion circuit 95 supplies the enable signal $e_{k+1}$ to an enable-signal output terminal 83. On the other hand, the addition circuit 93 supplies the string bits following the most significant bit on the string of bits to a phase-offset output terminal 84 as the phase offset $\Phi_{k+1}$.

Algorithms for finding values in the phase synchronization circuit having a serial configuration as described above are explained in Non-Patent Documents 1 and 2.

The reader is advised to keep in mind that it is also possible to configure a recording/reproduction system from a recording apparatus provided with the transmitting-side base band block 11 and from a reproduction apparatus provided with the receiving-side base band block 33. In this case, the reproduction apparatus reproduces data, which has been recorded by the recording apparatus on a recording medium, from the recording medium.

By the way, in recent years, there are rising demands for higher data transfer speeds in communication systems and recording/reproduction systems. Such demands set an increasing trend of the symbol frequency. If a phase synchronization circuit having a serial configuration as described above is used, the symbol frequency can be increased to a demanded value by raising the operation frequency of the circuit. However, the operation frequency of the circuit has an upper limit imposed by, among others, semiconductor processes. Thus, in some cases, the symbol frequency cannot be increased to the demanded value.

In order to solve the problem described above, a technique referred to as an N-signals concurrent processing technique for implementing a phase synchronization circuit has been introduced in recent years. In accordance with this technique which is adopted in several cases, the phase synchronization circuit is operated at a clock frequency equal to 1/N times the sampling frequency and N received signals are processed in N-signals concurrent processing for every clock period. In this case, N is an integer not smaller than 2. In an interpolation-type phase synchronization circuit adopting the N-signals concurrent processing technique, N received symbols and N enable signals each generated for one of the N received symbols are output for every clock period.

FIG. 5 is a diagram showing a typical configuration of an N-signals concurrent-processing phase synchronization circuit implemented by adoption of algorithms identical with the algorithms adopted by the phase synchronization circuit having the serial configuration described above.

As shown in FIG. 5, the phase synchronization circuit 43 functioning as an N-signals concurrent-processing phase synchronization circuit is configured to include interpolation FIR filters 111-1 to 111-N and signal processing circuits 112-1 to 112-N. The interpolation FIR filters 111-1 to 111-N and the signal processing circuits 112-1 to 112-N are connected alternately to each other in a nose-to-tail form. Each of the signal processing circuits 112-1 to 112-N has a configuration identical with the configuration of the signal processing circuit 62 shown in FIG. 2. The receiving-side filter 42 supplies a received signal to each of the interpolation FIR filters 111-1 to 111-N by way of an input terminal 101.

The interpolation FIR filter 111-1 carries out interpolation processing by making use of a phase offset $\Phi_k$ found by the signal processing circuit 112-N in order to output a received symbol $y_k$. The received symbol $y_k$ output by the interpolation FIR filter 111-1 is supplied to a received-symbol output terminal 102 and the signal processing circuit 112-1 as a received symbol at the time k.

In the same way as the signal processing circuit 62 shown in FIG. 2, the signal processing circuit 112-1 computes the phase offset $\Phi_{k+1}$ and the enable signal $e_{k+1}$ on the basis of the received symbol $y_k$ and the enable signal $e_k$ generated by the signal processing circuit 112-N. The signal processing circuit 112-1 outputs the phase offset $\Phi_{k+1}$ to the interpolation FIR filter 111-2 and the enable signal $e_{k+1}$ to the signal processing circuit 112-2 as well as an enable-signal output terminal 103.

The interpolation FIR filter 111-2 carries out interpolation processing by making use of a phase offset $\Phi_{k+1}$ found by the signal processing circuit 112-1 in order to output a received symbol $y_{k+1}$. The received symbol $y_{k+1}$ output by the interpolation FIR filter 111-2 is supplied to the received-symbol output terminal 102 and the signal processing circuit 112-2 as a received symbol at the time (k+1).

The signal processing circuit 112-2 computes the phase offset $\Phi_{k+2}$ and the enable signal $e_{k+2}$ on the basis of the received symbol $y_{k+1}$ and the enable signal $e_{k+1}$ generated by the signal processing circuit 112-1. The signal processing circuit 112-2 outputs the phase offset $\Phi_{k+2}$ to the immediately succeeding stage and the enable signal $e_{k+2}$ to the immediately succeeding stage as well as the enable-signal output terminal 103.

An interpolation FIR filter provided at every later stage also carries out the same processing described above whereas a signal processing circuit provided at every later stage also carries out the same processing described above. The interpolation FIR filter 111-N carries out interpolation processing on the received signal by making use of a phase offset $\Phi_{k+N-1}$ found by a signal processing circuit provided at the immediately preceding stage in order to output a received symbol $y_{k+N-1}$. The received symbol $y_{k+N-1}$ output by the interpolation FIR filter 111-N is supplied to the received-symbol output terminal 102 and the signal processing circuit 112-N as a received symbol at the time (k+N−1).

The signal processing circuit 112-N computes the phase offset $\Phi_k$ and the enable signal $e_k$ on the basis of the received symbol $y_{k+N-1}$ and the enable signal $e_{k+N-1}$ generated by the signal processing circuit 112-N-1 not shown in FIG. 5. The signal processing circuit 112-N outputs the phase offset $\Phi_k$ to the interpolation FIR filter 111-1 and the enable signal $e_k$ to the signal processing circuit 112-1 as well as the enable-signal output terminal 103.

By adopting the configuration described above, the size of the phase synchronization circuit 43 functioning as an N-signals concurrent-processing phase synchronization circuit is about N times the size of the phase synchronization circuit 43 having the serial configuration. That is to say, the size of the phase synchronization circuit 43 is undesirably very large. In addition, the amount of processing carried out per clock period in the phase synchronization circuit 43 is also about N times the amount of processing carried out per clock period in the phase synchronization circuit 43 having the serial configuration. Thus, it is difficult to set the maximum operation frequency of the phase synchronization circuit 43 at a value at least (1/N) times the maximum operation frequency of the phase synchronization circuit 43 having the serial configuration.

Patent Document 1 discloses algorithms for implementing a phase synchronization circuit downsized to function as an N-signals concurrent-processing phase synchronization circuit. The algorithms disclosed in Patent Document 1 are explained as follows.

The configuration of an N-signals concurrent-processing phase synchronization circuit adopting the algorithms disclosed in Patent Document 1 is itself identical with the configuration of the phase synchronization circuit 43 shown in FIG. 2. The unit of data processed in each circuit is an N-data unit.

Each of the interpolation FIR filter 61, the phase-error detection circuit 71 and the loop filter 72 carries out processing based on algorithms identical with the algorithms adopted by their respective counterparts in the phase synchronization circuit 43 having the serial configuration.

On the other hand, the NCO 73 updates N phase offsets and N enable signals in accordance with following Eqs. (7) and (8) respectively at the time k.

$$\phi_{k+i} = \begin{cases} \phi_{k+i-1} + (\mu - 1) + l_{k+i-1-N}, & \text{if } \phi_{k+i-1} < 1 \\ \phi_{k+i-1} - 1, & \text{else} \end{cases} \quad (7)$$

$$e_{k+i} = \begin{cases} 1, & \text{if } \phi_{k+i} < 1 \\ 0, & \text{else} \end{cases} \quad (8)$$

In Eqs. (7) and (8), notation i is an integer having a value in the range 1 to N. It is to be noted that Eqs. (7) and (8) are described in Patent Document 1 as equations for updating the phase offset and the enable signal respectively.

By comparing Eqs. (5) and (7) with each other, the following difference becomes obvious. In the phase synchronization circuit having the serial configuration, the phase-error correction value $l_k$ is used in the computation of the phase offset $\Phi_k$ used in the interpolation processing carried out in order to generate the received symbol at the time (k+1). In the N-signals concurrent-processing interpolation-type phase synchronization circuit disclosed in Patent Document 1, on the other hand, the phase-error correction value $l_k$ is used in the computation of the phase offset $\Phi_{k+N}$ used in the interpolation processing carried out in order to generate the received symbol at the time (k+N).

In general, in a phase synchronization circuit carrying out feedback control, if the delay to the reflection of information obtained from an output result becomes long, the phase synchronization circuit displays poor performance that the range of synchronizable symbol frequencies becomes narrow.

FIG. 6 is a diagram showing the circuit configuration of the NCO 73 updating the phase offset by adoption of the algorithm disclosed in Patent Document 1. The circuit configuration of the NCO 73 shown in FIG. 6 is obtained by interconnecting four configurations, which are each shown in FIG. 4, in parallel. That is to say, the circuit configuration of the NCO 73 shown in FIG. 6 is obtained by setting N at 4 (that is, N=4). The circuit configuration of the NCO 73 shown in FIG. 6 is explained by properly omitting explanation of what have been described before as follows. The loop filter 72 supplies phase-error correction values $l_k$, $l_{k-1}$, $l_{k-2}$ and $l_{k-3}$ output thereby as a four-data unit to respectively input terminals 122-1, 122-2, 122-3 and 122-4.

An addition circuit 141-1 adds (μ−1) received from an input terminal 121 to the phase-error correction value $l_k$ in order to generate a sum. A select circuit 142-1 selects the value 0 or the sum in accordance with the most significant bit of a bit string found on the basis of the phase-error correction value $l_{k-1}$.

An addition circuit 143-1 adds the value selected by the select circuit 142-1 to a value represented by the bit string found on the basis of the phase-error correction value in order to produce a sum. However, the bit string to be added to the output of the select circuit 142-1 excludes the most significant bit of the bit string. The sum generated by the addition circuit 143-1 is stored in a buffer 145. The sum stored in the buffer 145 will be used in the computation of the phase offset $\Phi_{k+1}$ and the enable signal $e_{k+1}$.

The most significant bit of the sum is inverted by the inversion circuit 144-1 in order to produce the enable signal $e_{k+4}$. The inversion circuit 144-1 supplies the enable signal $e_{k+4}$ to an enable-signal output terminal 131-1. On the other hand, the addition circuit 143-1 supplies the string bits following the most significant bit of the sum to a phase-offset output terminal 132-1 as the phase offset $\Phi_{k+4}$.

The NCO 73 having the circuit configuration shown in FIG. 6 is capable of computing phase offsets to be used in the interpolation processing carried out on four received signals. However, the computation itself is carried out as serial processing so that it is difficult to increase the speed of the operation.

In the computation of the phase offset $\Phi_{k+4}$ for example, a value found on the basis of the phase-error correction value $l_{k-1}$ is demanded. By the same token, in the computation of the phase offset $\Phi_{k+3}$, a value found on the basis of the phase-error correction value $l_{k-2}$ is demanded. In the same way, in the computation of the phase offset $\Phi_{k+2}$, a value found on the basis of the phase-error correction value $l_{k-3}$ is demanded. Similarly, in the computation of the phase offset $\Phi_{k+1}$, a value found on the basis of the phase-error correction value $l_k$ is demanded.

The following description explains algorithms each disclosed in Patent Document 2 to serve as an algorithm for raising the speed of the operation carried out by an N-signals concurrent-processing phase synchronization circuit.

Patent Document 2 discloses the circuit configuration of a two-signals concurrent-processing interpolation-type phase synchronization circuit and a method of extending the circuit configuration in order to construct an N-signals concurrent-processing interpolation-type phase synchronization circuit for N≧3. In addition, Patent Document 2 also discloses an algorithm for computing a phase offset $\Phi'_{k+i}$ to be used in N interpolation FIR filters where 1≦i≦N in accordance with Eq. (9) given below. In Eq. (9), an inferred symbol period ($\mu+k_k$) is a value obtained as a result of correcting the ratio $\mu$ by making use of the phase-error correction value $l_k$.

$$\Phi'_{k+i} = (\Phi'_k + i) \bmod (\mu + l_k) \quad (9)$$

The algorithms disclosed in Patent Document 2 are algorithms each used for computing N phase offsets at the same time independently of each other. In the computation of N phase offsets the same inferred symbol period ($\mu+l_k$) common to all the N phase offsets $\Phi'_{k+i}$ is used.

In a configuration for computing three phase offsets at the same time for example, as shown in FIG. 7, there are intervals n, (n+1) and (n+2) during which the three phase offsets are computed. The intervals n, (n+1) and (n+2) are intervals for symbols to be found. During each of the intervals, the ratio $\mu$ serving as a normalized symbol period is corrected to the same period ($\mu+l_k$) to be used in the computation of each of the phase offset. Each white circle shown in FIG. 7 represents a received symbol.

That is to say, in the operation to compute the phase offset $\Phi'_{k+i}$ by making use of Eq. (9), the phase of the received signal is compared with the symbol phase corrected by making the phase-error correction value $l_k$ proportional to the symbol-interval count N, that is, by making the phase-error correction value $l_k$ proportional to the length of the elapsed time.

In addition, the algorithms disclosed in Non-Patent Document 1 are algorithms for inferring a phase offset between a received symbol $y_k$ and a received symbol succeeding the received symbol $y_k$. On the other hand, the algorithms disclosed in Patent Document 2 are algorithms for inferring a phase offset between a received symbol $y_k$ and a received symbol preceding the received symbol $y_k$.

In an operation to compute enable signals $e_{k+1}$ and $e_{k+2}$ by carrying out two-signals concurrent processing, Eqs. (10) and (11) given below are used respectively. Eqs. (10) and (11) are equations expressing the computations based on the algorithms disclosed in Patent Document 2.

$$e_{k+1} = \begin{cases} 1, & \text{if } \phi'_{k+1} > \mu + l_k \\ 0, & \text{else} \end{cases} \quad (10)$$

$$e_{k+2} = \begin{cases} 1, & \text{if } \{(\phi'_k + 1) \le (\mu + l_k) \text{ and } (\phi'_k + 2) > (\mu + l_k)\} \text{ or} \\ & \{(\phi'_{k+1} + 1) > (\mu + l_k) \text{ and } (\phi'_k + 2 - (\mu + l_k)) > (\mu + l_k)\} \\ 0, & \text{else} \end{cases} \quad (11)$$

In Eq. (11) for computing the enable signal $e_{k+2}$, it is necessary to know the result of determining whether or not the relation ($\Phi'_{k+i} > \mu + l_k$) for the enable signal $e_{k+1}$ holds true. Thus, in an operation to compute the enable signal $e_{k+i}$ (where 1<i≦N) for N≧3, it is assumed that the results of computing the enable signals $e_{k+1}$ to $e_{k+i-1}$ are demanded.

SUMMARY

In accordance with the phase synchronization method disclosed in Patent Document 2, as described above, the phase-error correction values output by the loop filters as values to be used for updating N phase offsets are utilized as correction values proportional to the total number of symbol intervals.

However, correction values supposed to be considered in the computation of a phase offset include a correction value proportional to the number of symbol intervals and a correction value not proportional to the number of symbol intervals. That is to say, the correction values include a correction value proportional to the length of the elapsed time and a correction value not proportional to the length of the elapsed time. The correction value proportional to the length of the elapsed time is a correction value used for changing the symbol interval as shown in FIG. 7. On the other hand, the correction value not proportional to the length of the elapsed time is a correction value used for shifting the position of the symbol interval by sustaining the interval itself as it is.

The phase synchronization circuit having a serial configuration carries out phase correction processing on received signals serially on a one-signal-after-another basis. In addition, the amount of the phase correction processing is not greater than the processing carried out to generate one received symbol. Thus, it is not necessary to consider separation of their correction values into consideration. In the case of an N-signals concurrent-processing phase synchronization circuit for carrying out phase correction processing to produce two or more received symbols at one time, however, an error will be unavoidably generated in the phase correction processing unless the correction values are separated from each other.

In accordance with a phase synchronization method disclosed in Patent Document 2, the phase offset is updated by making use of only a correction value proportional to the length of the elapsed time. Thus, the time it takes to converge the phase inevitably becomes long. So far, there is not known a method adopted by the N-signals concurrent-processing phase synchronization circuit as a method for updating the phase offset by separating a correction value proportional to the length of the elapsed time from a correction value not proportional to the length of the elapsed time.

In addition, in accordance with the phase synchronization methods disclosed in Patent Documents 1 and 2, in processing to find an enable signal to be used for identifying each candidate for a received symbol, a phase offset preceding the present phase offset by one received symbol is used. Thus, the configuration of a circuit for implementing is a configuration in which N circuits are connected to each other in series as explained by referring to FIG. 6. In the case of such a configuration, for a large integer N representing the degree of parallelism, the maximum operating speed is reduced unavoidably to a low value. In addition, Patent Document 2 does not describe a method for generating an enable signal for the integer N set at three or larger.

It is desirable to provide an N-signals concurrent processing phase synchronization circuit capable of correcting the phases of received signals, which have been sampled at sampling periods asynchronous with symbol periods, by carrying out concurrent processing to generate a plurality of received symbols so that the phases can be synchronized at a higher speed.

A phase synchronization apparatus according to a first embodiment of the present technology employs:

a sampling section configured to carry out discrete sampling processing at a sampling period $T_p$ on an analog base band signal representing data received from another apparatus;

a phase-error detection section configured to detect phase errors which are phase differences between the phases of N received signals obtained as a result of the discrete sampling processing and the phases of M inferred received symbols having a symbol period $T_s$ where N is an integer at least equal to 2 whereas M is an integer neither smaller than 0 nor greater than the integer N;

a first computation section configured to find a phase-error correction value $m_{P,k}$ proportional to the sum of phase errors of the N received signals and find a frequency-error correction value $m_{I,k}$ proportional to the sum of phase errors of all received signals processed so far on the basis of the phase errors detected by the phase-error detection section;

a second computation section configured to find a phase offset $\Phi_{k+i}$ representing a correction quantity for the phase of each of the N received signals (where i is an integer at least equal to 1 but not greater than the integer N) by adding the frequency-error correction value $m_{I,k}$ found by the first computation section to a ratio $\mu(\equiv T_s/T_p)$ in order to produce a sum $(m_{I,k}+\mu)$, multiplying the integer i by the sum $(m_{I,k}+\mu)$ in order to produce a product $i \cdot (m_{I,k}+\mu)$, adding a phase offset $\Phi_k$ to the phase-error correction value $m_{P,k}$ found by the first computation section in order to produce a sum $(\Phi_k+m_{P,k})$, adding the sum $(\Phi_k+m_{P,k})$ to the product $i \cdot (m_{I,k}+\mu)$ in order to produce a sum $\{\Phi_k+m_{P,k}+i \cdot (m_{I,k}+\mu)\}$, subtracting the integer i from the sum $\{\Phi_k+m_{P,k}+i \cdot (m_{I,k}+\mu)\}$ in order to produce a difference $\{\Phi_k+m_{P,k}+i \cdot (m_{I,k}+\mu)-i\}$, dividing the difference $\{\Phi_k+m_{P,k}+i \cdot (m_{I,k}+\mu)-i\}$ by the sum $(m_{I,k}+\mu)$ in order to produce a remainder $[\{\Phi_k+m_{P,k}+i \cdot (m_{I,k}+\mu)-i\} \bmod (m_{I,k}+\mu)]$, and taking the remainder $[\{\Phi_k+m_{P,k}+i \cdot (m_{I,k}+\mu)-i\} \bmod (m_{I,k}+\mu)]$ as the phase offset $\Phi_{k+i}$; and an interpolation section configured to find M received symbols from the N received signals at each of times $N \cdot T_p$ in a batch operation by carrying out interpolation processing on the basis of the phase offset $\Phi_{k+i}$ found by the second computation section.

The interpolation section is driven to correct the phases of the received signals if the phase offset $\Phi_{k+i}$ found by the second computation section is a correction quantity corresponding to a period not shorter than a period $T_r$ satisfying relations $-T_p \leq Tr \leq 0$ but shorter than a period of $(T_r+T_p)$, that is, if the phase offset $\Phi_{k+i}$ found by the second computation section is a correction quantity corresponding to a period longer than the period $T_r$ but not longer than the period of $(T_r+T_p)$.

A phase synchronization method adopted by a phase synchronization apparatus according to the first embodiment of the present technology has:

carrying out discrete sampling processing at a sampling period $T_p$ on an analog base band signal representing data received from another apparatus;

detecting phase errors which are phase differences between the phases of N received signals obtained as a result of the discrete sampling processing and the phases of M inferred received symbols having a symbol period $T_s$ where N is an integer at least equal to 2 whereas M is an integer neither smaller than 0 nor greater than the integer N;

finding a phase-error correction value $m_{P,k}$ proportional to the sum of phase errors of the N received signals and finding a frequency-error correction value $m_{I,k}$ proportional to the sum of phase errors of all received signals processed so far on the basis of the detected phase errors;

finding a phase offset $\Phi_{k+i}$ representing a correction quantity for the phase of each of the N received signals (where i is an integer at least equal to 1 but not greater than the integer N) by adding the found frequency-error correction value $m_{I,k}$ to a ratio $\mu(\equiv T_s/T_p)$ in order to produce a sum $(m_{I,k}+\mu)$, multiplying the integer i by the sum $(m_{I,k}+\mu)$ in order to produce a product $i \cdot (m_{I,k}+\mu)$, adding a phase offset $\Phi_k$ to the found phase-error correction value $m_{P,k}$ in order to produce a sum $(\Phi_k+m_{P,k})$, adding the sum $(\Phi_k+m_{P,k})$ to the product $i \cdot (m_{I,k}+\mu)$ in order to produce a sum $\{\Phi_k+m_{P,k}+i \cdot (m_{I,k}+\mu)\}$, subtracting the integer i from the sum $\{\Phi_k+m_{P,k}+i \cdot (m_{I,k}+\mu)\}$ in order to produce a difference $\{\Phi_k+m_{P,k}+i \cdot (m_{I,k}+\mu)-i\}$, dividing the difference $\{\Phi_k+m_{P,k}+i \cdot (m_{I,k}+\mu)-i\}$ by the sum $(m_{I,k}+\mu)$ in order to produce a remainder $[\{\Phi_k+m_{P,k}+i \cdot (m_{I,k}+\mu)-i\} \bmod (m_{I,k}+\mu)]$, and taking the remainder $[\{\Phi_k+m_{P,k}+i \cdot (m_{I,k}+\mu)-i\} \bmod (m_{I,k}+\mu)]$ as the phase offset $\Phi_{k+i}$; and finding M received symbols from the N received signals at each of times $N \cdot T_p$ in a batch operation by carrying out interpolation processing on the basis of the found phase offset $\Phi_{k+i}$.

A phase synchronization program provided in accordance with the first embodiment of the present technology to serve as a program to be executed by a computer to carry out processing including:

carrying out discrete sampling processing at a sampling period $T_p$ on an analog base band signal representing data received from another apparatus;

detecting phase errors which are phase differences between the phases of N received signals obtained as a result of the discrete sampling processing and the phases of M inferred received symbols having a symbol period $T_s$ where N is an integer at least equal to 2 whereas M is an integer neither smaller than 0 nor greater than the integer N;

finding a phase-error correction value $m_{P,k}$ proportional to the sum of phase errors of the N received signals and finding a frequency-error correction value $m_{I,k}$ proportional to the sum of phase errors of all received signals processed so far on the basis of the detected phase errors;

finding a phase offset $\Phi_{k+i}$ representing a correction quantity for the phase of each of the N received signals (where i is an integer at least equal to 1 but not greater than the integer N) by adding the found frequency-error correction value $m_{I,k}$ to a ratio $\mu(\equiv T_s/T_p)$ in order to produce a sum $(m_{I,k}+\mu)$.

multiplying the integer i by the sum $(m_{I,k}+\mu)$ in order to produce a product $i\cdot(m_{I,k}+\mu)$, adding a phase offset $\Phi_k$ to the found phase-error correction value $m_{P,k}$ in order to produce a sum $(\Phi_k+m_{P,k})$, adding the sum $(\Phi_k+m_{P,k})$ to the product $i\cdot(m_{I,k}+\mu)$ in order to produce a sum $\{\Phi_k+m_{P,k}+i\cdot(m_{I,k}+\mu)\}$, subtracting the integer i from the sum $\{\Phi_k+m_{P,k}+i\cdot(m_{I,k}+\mu)\}$ in order to produce a difference $\{\Phi_k+m_{P,k}+i\cdot(m_{I,k}+\mu)-i\}$, dividing the difference $\{\Phi_k+m_{P,k}+i\cdot(m_{I,k}+\mu)-i\}$ by the sum $(m_{I,k}+\mu)$ in order to produce a remainder $[\{\Phi_k+m_{P,k}+i\cdot(m_{I,k}+\mu)-i\} \bmod (m_{I,k}+\mu)]$, and taking the remainder $[\{\Phi_k+m_{P,k}+i\cdot(m_{I,k}+\mu)-i\} \bmod (m_{I,k}+\mu)]$ as the phase offset $\Phi_{k+i}$; and finding M received symbols from the N received signals at each of times $N\cdot T_p$ in a batch operation by carrying out interpolation processing on the basis of the found phase offset $\Phi_{k+i}$.

A phase synchronization apparatus according to a second embodiment of the present technology employs:

a sampling section configured to carry out discrete sampling processing at a sampling period $T_p$ on an analog base band signal representing data received from another apparatus;

a phase-error detection section configured to detect phase errors which are phase differences between the phases of N received signals obtained as a result of the discrete sampling processing and the phases of M inferred received symbols having a symbol period $T_s$ where N is an integer at least equal to 2 whereas M is an integer neither smaller than 0 nor greater than the integer N;

a first computation section configured to find a phase-error correction value $m_{P,k}$ proportional to the sum of phase errors of the N received signals and find a frequency-error correction value $m_{I,k}$ proportional to the sum of phase errors of all received signals processed so far on the basis of the phase errors detected by the phase-error detection section;

a second computation section configured to find a phase offset $\Phi_{k+i}$ representing a correction quantity for the phase of each of the N received signals (where i is an integer at least equal to 1 but not greater than the integer N) by adding the integer i to a phase offset $\Phi_k$ in order to produce a sum $(i+\Phi_k)$, subtracting the phase-error correction value $m_{P,k}$ found by the first computation section from the sum $(i+\Phi_k)$ in order to produce a difference $(i+\Phi_k-m_{P,k})$, adding the frequency-error correction value $m_{I,k}$ found by the first computation section to a ratio $\mu(\equiv T_s/T_p)$ in order to produce a sum $(m_{I,k}+\mu)$, dividing the difference $(i+\Phi_k-m_{P,k})$ by the sum $(m_{I,k}+\mu)$ in order to produce a remainder $\{(i+\Phi_k-m_{P,k}) \bmod (m_{I,k}+\mu)\}$, and taking the remainder $\{(i+\Phi_k-m_{P,k}) \bmod (m_{I,k}+\mu)\}$ as the phase offset $\Phi_{k+i}$; and an interpolation section configured to find M received symbols from the N received signals at each of times $N\cdot T_p$ in a batch operation by carrying out interpolation processing on the basis of the phase offset $\Phi_{k+i}$ found by the second computation section.

A phase synchronization method adopted by a phase synchronization apparatus according to the second embodiment of the present technology has:

carrying out discrete sampling processing at a sampling period $T_p$ on an analog base band signal representing data received from another apparatus;

detecting phase errors which are phase differences between the phases of N received signals obtained as a result of the discrete sampling processing and the phases of M inferred received symbols having a symbol period $T_s$ where N is an integer at least equal to 2 whereas M is an integer neither smaller than 0 nor greater than the integer N;

finding a phase-error correction value $m_{P,k}$ proportional to the sum of phase errors of the N received signals and finding a frequency-error correction value $m_{I,k}$ proportional to the sum of phase errors of all received signals processed so far on the basis of the detected phase errors;

finding a phase offset $\Phi_{k+i}$ representing a correction quantity for the phase of each of the N received signals (where i is an integer at least equal to 1 but not greater than the integer N) by adding the integer i to a phase offset $\Phi_k$ in order to produce a sum $(i+\Phi_k)$, subtracting the found phase-error correction value $m_{P,k}$ from the sum $(i+\Phi_k)$ in order to produce a difference $(i+\Phi_k-m_{P,k})$, adding the found frequency-error correction value $m_{I,k}$ to a ratio $\mu(\equiv T_s/T_p)$ in order to produce a sum $(m_{I,k}+\mu)$, dividing the difference $(i+\Phi_k-m_{P,k})$ by the sum $(m_{I,k}+\mu)$ in order to produce a remainder $\{(i+\Phi_k-m_{P,k}) \bmod (m_{I,k}+\mu)\}$, and taking the remainder $\{(i+\Phi_k-m_{P,k}) \bmod (m_{I,k}+\mu)\}$ as the phase offset $\Phi_{k+i}$; and finding M received symbols from the N received signals at each of times $N\cdot T_p$ in a batch operation by carrying out interpolation processing on the basis of the found phase offset $\Phi_{k+i}$.

A phase synchronization program provided in accordance with the second embodiment of the present technology to serve as a program to be executed by a computer to carry out processing including:

carrying out discrete sampling processing at a sampling period $T_p$ on an analog base band signal representing data received from another apparatus;

detecting phase errors which are phase differences between the phases of N received signals obtained as a result of the discrete sampling processing and the phases of M inferred received symbols having a symbol period $T_s$ where N is an integer at least equal to 2 whereas M is an integer neither smaller than 0 nor greater than the integer N;

finding a phase-error correction value $m_{P,k}$ proportional to the sum of phase errors of the N received signals and finding a frequency-error correction value $m_{I,k}$ proportional to the sum of phase errors of all received signals processed so far on the basis of the detected phase errors;

finding a phase offset $\Phi_{k+i}$ representing a correction quantity for the phase of each of the N received signals (where i is an integer at least equal to 1 but not greater than the integer N) by adding the integer i to a phase offset $\Phi_k$ in order to produce a sum (i+$\Phi_k$), subtracting the found phase-error correction value $m_{P,k}$ from the sum (i+$\Phi_k$) in order to produce a difference (i+$\Phi_k$−$m_{P,k}$), adding the found frequency-error correction value $m_{I,k}$ to a ratio $\mu(\equiv T_s/T_p)$ in order to produce a sum ($m_{I,k}$+$\mu$), dividing the difference (i+$\Phi_k$−$m_{P,k}$) by the sum ($m_{I,k}$+$\mu$) in order to produce a remainder {(i+$\Phi_k$−$m_{P,k}$) mod ($m_{I,k}$+$\mu$)}, and taking the remainder {(i+$\Phi_k$−$m_{P,k}$) mod ($m_{I,k}$+$\mu$)} as the phase offset $\Phi_{k+i}$; and finding M received symbols from the N received signals at each of times N·$T_p$ in a batch operation by carrying out interpolation processing on the basis of the found phase offset $\Phi_{k+i}$.

In accordance with the first embodiment of the present technology, discrete sampling processing is carried out at a sampling period $T_p$ on an analog base band signal representing data received from another apparatus. Then, phase-error detection processing is carried out in order to detect phase errors which are phase differences between the phases of N received signals obtained as a result of the discrete sampling processing and the phases of M inferred received symbols having a symbol period $T_s$ where N is an integer at least equal to 2 whereas M is an integer neither smaller than 0 nor greater than the integer N. Subsequently, first computation processing is carried out in order to find a phase-error correction value $m_{P,k}$ proportional to the sum of phase errors of the N received signals and find a frequency-error correction value $m_{I,k}$ proportional to the sum of phase errors of all received signals processed so far on the basis of the phase errors detected in the phase-error detection processing. Then, second computation processing is carried out in order to find a phase offset $\Phi_{k+i}$ representing a correction quantity of the phase of each of the N received signals (where i is an integer at least equal to 1 but not greater than the integer N) by:

adding the frequency-error correction value $m_{I,k}$ found by the first computation section to a ratio $\mu(\equiv T_s/T_p)$ in order to produce a sum ($m_{I,k}$+$\mu$);

multiplying the integer i by the sum ($m_{I,k}$+$\mu$) in order to produce a product i·($m_{I,k}$+$\mu$);

adding a phase offset $\Phi_k$ to the phase-error correction value $m_{P,k}$ found by the first computation section in order to produce a sum ($\Phi_k$+$m_{P,k}$);

adding the sum ($\Phi_k$+$m_{P,k}$) to the product i·($m_{I,k}$+$\mu$) in order to produce a sum {$\Phi_k$+$m_{P,k}$+i·($m_{I,k}$+$\mu$)};

subtracting the integer i from the sum {$\Phi_k$+$m_{P,k}$+i·($m_{I,k}$+$\mu$)} in order to produce a difference {$\Phi_k$+$m_{P,k}$+i·($m_{I,k}$+$\mu$)−i};

dividing the difference {$\Phi_k$+$m_{P,k}$+i·($m_{I,k}$+$\mu$)−i} by the sum ($m_{I,k}$+$\mu$) in order to produce a remainder [{$\Phi_k$+$m_{P,k}$+i·($m_{I,k}$+$\mu$)−i} mod ($m_{I,k}$+$\mu$)]; and taking the remainder [{$\Phi_k$+$m_{P,k}$+i·($m_{I,k}$+$\mu$)−i} mod ($m_{I,k}$+$\mu$)] as the phase offset $\Phi_{k+i}$.

Finally, M received symbols are found from the N received signals at each of times N·$T_p$ in a batch operation by carrying out interpolation processing on the basis of the phase offset $\Phi_{k+i}$ found in the second computation processing.

In accordance with the second embodiment of the present technology, discrete sampling processing is carried out at a sampling period $T_p$ on an analog base band signal representing data received from another apparatus. Then, phase-error detection processing is carried out in order to detect phase errors which are phase differences between the phases of N received signals obtained as a result of the discrete sampling processing and the phases of M inferred received symbols having a symbol period $T_s$ where N is an integer at least equal to 2 whereas M is an integer neither smaller than 0 nor greater than the integer N. Subsequently, first computation processing is carried out in order to find a phase-error correction value $m_{P,k}$ proportional to the sum of phase errors of the N received signals and find a frequency-error correction value $m_{I,k}$ proportional to the sum of phase errors of all received signals processed so far on the basis of the phase errors detected in the phase-error detection processing. Then, second computation processing is carried out in order to find a phase offset $\Phi_{k+i}$ representing a correction quantity of the phase of each of the N received signals (where i is an integer at least equal to 1 but not greater than the integer N) by:

adding the integer i to the phase offset $\Phi_k$ in order to produce a sum (i+$\Phi_k$);

subtracting the phase-error correction value $m_{P,k}$ found by the first computation section from the sum (i+$\Phi_k$) in order to produce a difference (i+$\Phi_k$−$m_{P,k}$);

adding the frequency-error correction value $m_{I,k}$ found by the first computation section to a ratio $\mu(\equiv T_s/T_p)$ in order to produce a sum ($m_{I,k}$+$\mu$);

dividing the difference (i+$\Phi_k$−$m_{P,k}$) by the sum ($m_{I,k}$+$\mu$) in order to produce a remainder {(i+$\angle_k$−$m_{P,k}$) mod ($m_{I,k}$+$\mu$)}; and taking the remainder {(i+$\Phi_k$−$m_{P,k}$) mod ($m_{I,k}$+$\mu$)} as the phase offset $\Phi_{k+i}$.

Finally, M received symbols are found from the N received signals at each of times N·$T_p$ in a batch operation by carrying out interpolation processing on the basis of the phase offset $\Phi_{k+i}$ found in the second computation processing.

In accordance with the present technology, it is possible to provide an N-signals concurrent processing phase synchronization circuit capable of correcting the phases of received signals, which have been sampled at sampling periods asynchronous with symbol periods, by carrying out concurrent processing to generate a plurality of received symbols so that the phases can be synchronized at a higher speed.

DETAILED DESCRIPTION OF THE PREFERRED EMBODIMENT

Typical Configuration of a Phase Synchronization Circuit

Figure 8:
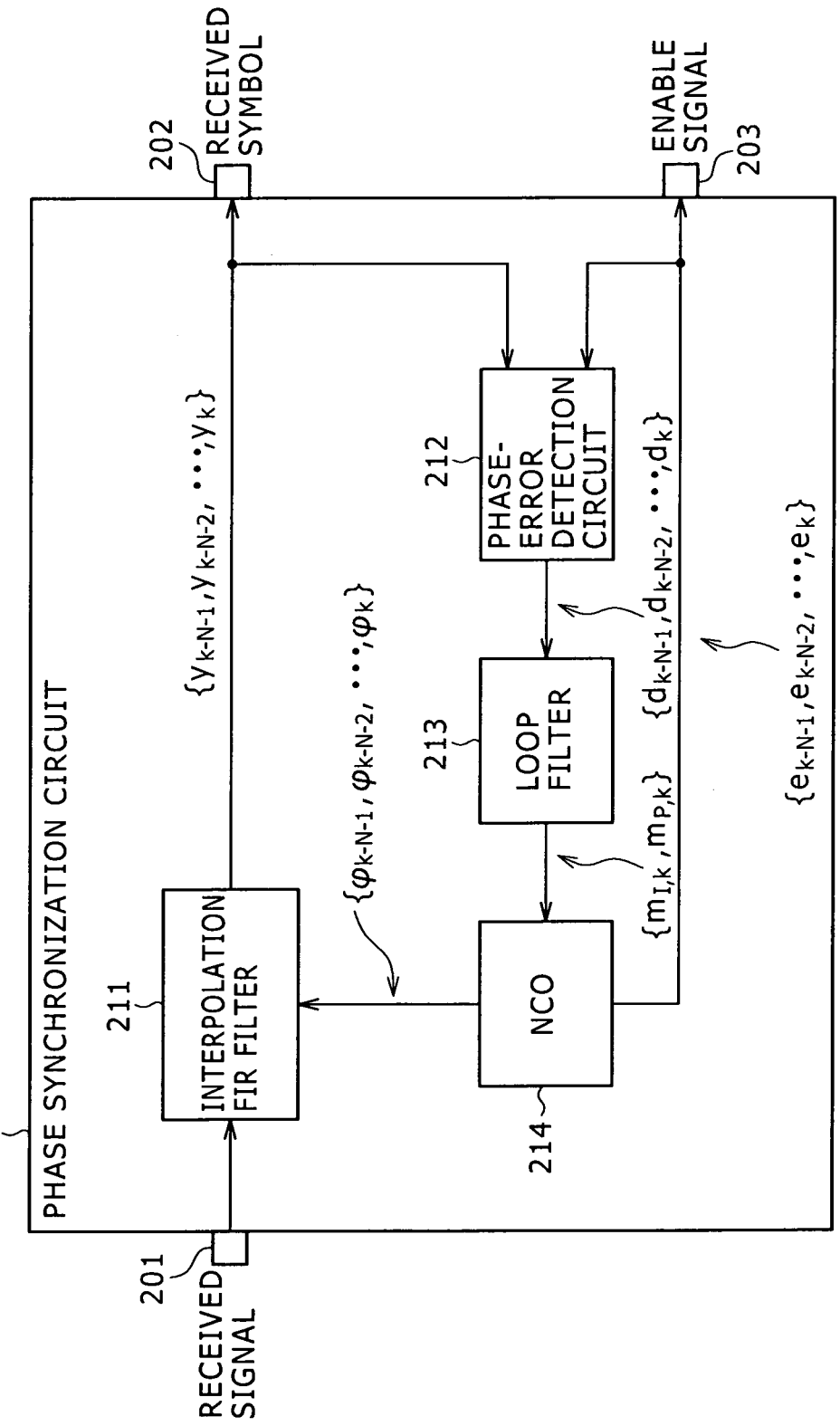
FIG. 8 is a block diagram showing a typical configuration of a phase synchronization circuit employed in a signal receiving apparatus according to an embodiment of the present technology.

FIG. 8 is a block diagram showing a typical configuration of a phase synchronization circuit 43 employed in a signal receiving apparatus according to an embodiment of the present technology.

Figure 1:
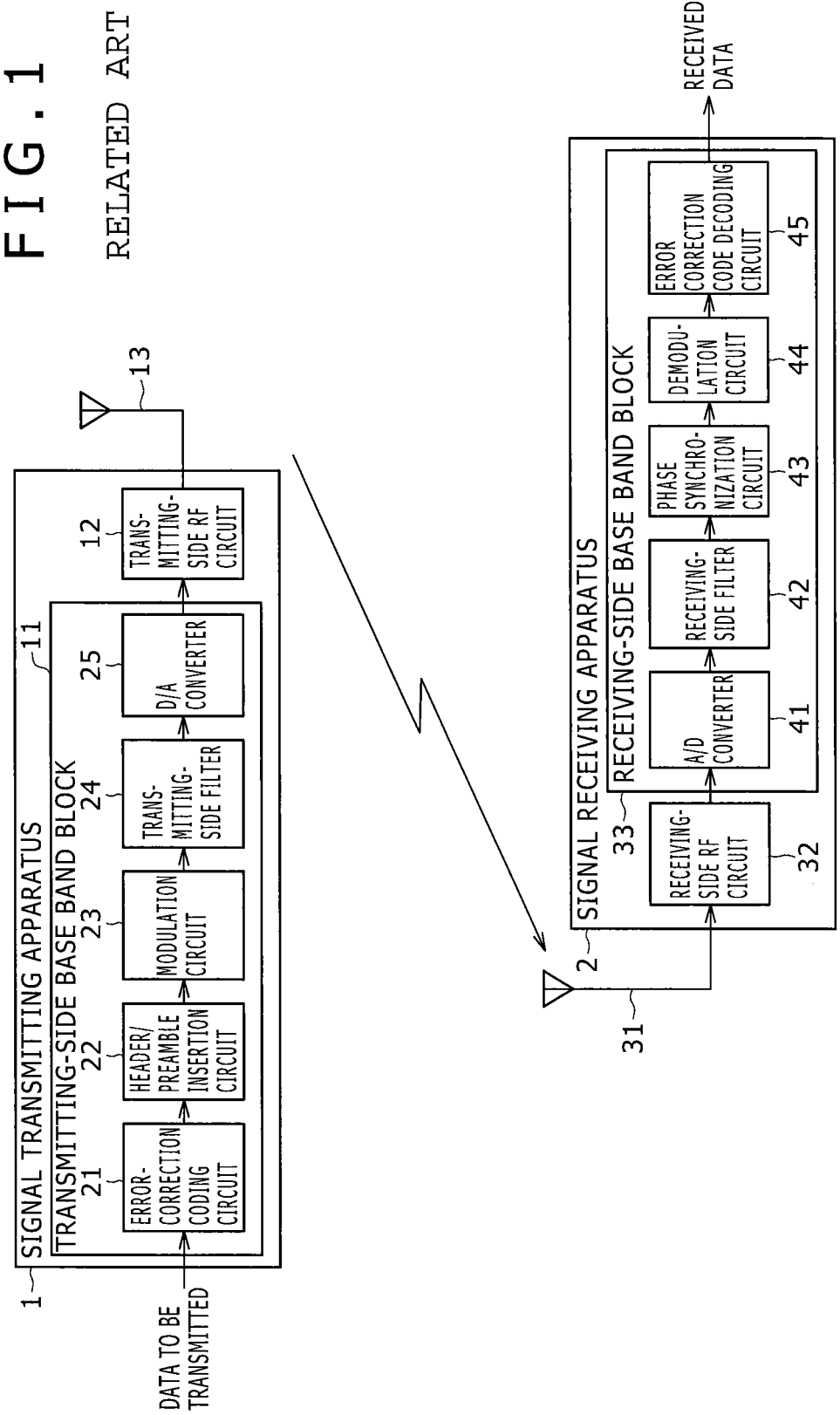
FIG. 1 is a block diagram showing a typical configuration of a radio communication system.

The phase synchronization circuit 43 shown in FIG. 8 is employed in the receiving-side base band block 33 shown in FIG. 1. The other configuration sections of the signal receiving apparatus according to the embodiment of the present technology are identical with those of the signal receiving apparatus shown in FIG. 1. Thus, the explanation of the other configuration sections is properly omitted in order to avoid redundancies of descriptions.

The signal receiving apparatus 2 employing the phase synchronization circuit 43 shown in FIG. 8 is configured to include an antenna 31, a receiving-side RF circuit 32 and a receiving-side base band block 33. The receiving-side base band block 33 is configured to include an A/D converter 41, a receiving-side filter 42, a phase synchronization circuit 43, a demodulation circuit 44 and an error correction code decoding circuit 45. The antenna 31 receives the RF transmission signal transmitted by the signal transmitting apparatus 1 and supplies the RF signal to the receiving-side RF circuit 32.

The receiving-side RF circuit 32 converts the RF signal received from the antenna 31 into an analog base band signal and supplies the analog base band signal to the A/D converter 41.

The A/D converter 41 carries out sampling processing on the analog base band signal received from the receiving-side RF circuit 32 at a sampling period $T_p$ asynchronous with a symbol period $T_s$. The A/D converter 41 supplies data obtained as a result of the sampling processing to the receiving-side filter 42 as a received signal. The A/D converter 41 functions as a sampling section for carrying out a discrete sampling process on the analog base band signal representing data transmitted from the signal transmitting apparatus 1 serving as another apparatus at a sampling period $T_p$.

The receiving-side filter 42 carries out a filtering process on the received signal supplied thereto by the A/D converter 41 and supplies the result of the filtering process to the phase synchronization circuit 43.

The phase synchronization circuit 43 implements symbol synchronization on the basis of the received signals supplied thereto by the receiving-side filter 42. That is to say, the phase synchronization circuit 43 carries out interpolation processing in order to find received symbols from the received signals and then supplies the received symbols to the demodulation circuit 44.

The demodulation circuit 44 carries out demodulation processing by adoption of a demodulation method corresponding to the modulation method adopted by the signal transmitting apparatus 1 in order to demodulate the received symbols. Then, the demodulation circuit 44 supplies received data obtained as a result of the demodulation processing to the error correction code decoding circuit 45.

The error correction code decoding circuit 45 carries out error correction processing on the received data supplied thereto by the demodulation circuit 44 and outputs the received data obtained as a result of the error correction processing to an external data recipient.

As shown in FIG. 8, the phase synchronization circuit 43 is configured to include an interpolation FIR filter 211, a phase-error detection circuit 212, a loop filter 213 and an NCO 214. N received signals are supplied by the receiving-side filter 42 to the interpolation FIR filter 211 by way of an input terminal 201. The phase synchronization circuit 43 shown in FIG. 8 is an N-signals concurrent-processing phase synchronization circuit for carrying out concurrent processing on the N received signals.

The interpolation FIR filter 211 carries out interpolation processing by making use of the N received signals at each time and each phase offset received from the NCO 214 for one of the N received signals, outputting N received symbols $y_k$ in a batch operation.

That is to say, the interpolation FIR filter 211 carries out interpolation processing by making use of a phase offset $\Phi_k$ in order to find a received symbol $y_k$ from a received signal received at a time k. In addition, the interpolation FIR filter 211 carries out interpolation processing by making use of a phase offset $\Phi_{k-N-2}$ in order to find a received symbol $y_{k-N-2}$ from a received signal received at a time (k−N−2). On top of that, the interpolation FIR filter 211 carries out interpolation processing by making use of a phase offset $\Phi_{k-N-1}$ in order to find a received symbol $y_{k-N-1}$ from a received signal received at a time (k−N−1). In this way, the interpolation FIR filter 211 carries out the same interpolation processing in order to find N received symbols, that is, the received symbols $y_{k-N-1}$ to $y_k$.

In a batch operation, the interpolation FIR filter 211 outputs the received symbols $y_k, \ldots, y_{k-N-2}$ and $y_{k-N-1}$ to the demodulation circuit 44 through a received-symbol output terminal 202 and the phase-error detection circuit 212.

The immediately succeeding stage makes use of the enable signal $e_k$ for determining whether or not each of the received symbols supplied thereto by the interpolation FIR filter 211 is to be processed. Each of the received symbols generated by the interpolation FIR filter 211 can be said to be a candidate for a received symbol.

It is also possible to provide a configuration in which the enable signal is also supplied to the interpolation FIR filter 211. In such a configuration, the interpolation FIR filter 211 carries out the interpolation processing on the received signal only if the value of the enable signal indicates that the interpolation processing is to be carried out. Typically, the value of the enable signal is set at 1 to indicate that the interpolation processing is to be carried out. In this case, if the sampling period $T_p$ is set at a value not longer than the symbol period $T_s$, the interpolation FIR filter 211 finds M received symbols from N received signals at times expressed by $N \cdot T_p$ in a batch operation where M is an integer in the range 0 to N. That is to say, the interpolation FIR filter 211 functions as an interpolation section for carrying out interpolation processing on the basis of the phase offset $\Phi_{k+i}$ in order to find M received symbols from N received signals at times expressed by $N \cdot T_p$ in a batch operation.

The phase-error detection circuit 212 detects a phase error on the basis of the received symbol output by the interpolation FIR filter 211 and the enable signal output by the NCO 214.

The phase-error detection circuit 212 detects the phase error typically in accordance with Eqs. (1) to (3).

To put it in detail, the phase-error detection circuit 212 detects a phase error $d_k$ on the basis of the received symbol $y_k$ output by the interpolation FIR filter 211 and the enable signal $e_k$ output by the NCO 214. In addition, the phase-error detection circuit 212 detects a phase error $d_{k-N-2}$ on the basis of the received symbol $y_{k-N-2}$ output by the interpolation FIR filter 211 and the enable signal $e_{k-N-2}$ output by the NCO 214. On top of that, the phase-error detection circuit 212 detects a phase error $d_{k-N-1}$ on the basis of the received symbol $y_{k-N-1}$ output by the interpolation FIR filter 211 and the enable signal $e_{k-N-1}$ output by the NCO 214. The phase-error detection circuit 212 carries out the same processing to generate the phase errors $d_{k-N-1}$ to $d_k$.

The phase-error detection circuit 212 thus functions as a phase-error detection section for detecting phase errors between the phases of N received signals obtained as a result of discrete sampling processing and phases inferred as the phases of M received symbols separated from each other by the period $T_s$.

The phase-error detection circuit 212 supplies the detected phase errors $d_k, \ldots, d_{k-N-2}$ and $d_{k-N-1}$ to the loop filter 213.

The loop filter 213 computes a phase-error correction value $m_{P,k}$ and a frequency-error correction value $m_{I,k}$ on the basis of the phase errors received from the phase-error detection circuit 212. Unlike the loop filter 72 of the phase synchronization circuit 43 shown in FIG. 2, the loop filter 213 computes two correction values, that is, the phase-error correction value $m_{P,k}$ and the frequency-error correction value $m_{I,k}$, as correction values to be used in an operation to compute (or update) the phase offset.

The phase-error correction value $m_{P,k}$ corresponds to the proportional term $\mu K_P d_k$ included in Eq. (4) utilized by the loop filter 72 shown in FIG. 2 in the computation of the phase-error correction value $l_k$. The phase-error correction value $m_{P,k}$ is used as a correction value independent of the elapsed time. The phase-error correction value $m_{P,k}$ is found by making use of Eq. (12) given as follows.

$$m_{P,k} = \mu\left(K_P \sum_{i=k-N-1}^{k} d_i\right) \quad (12)$$

Figure 2:
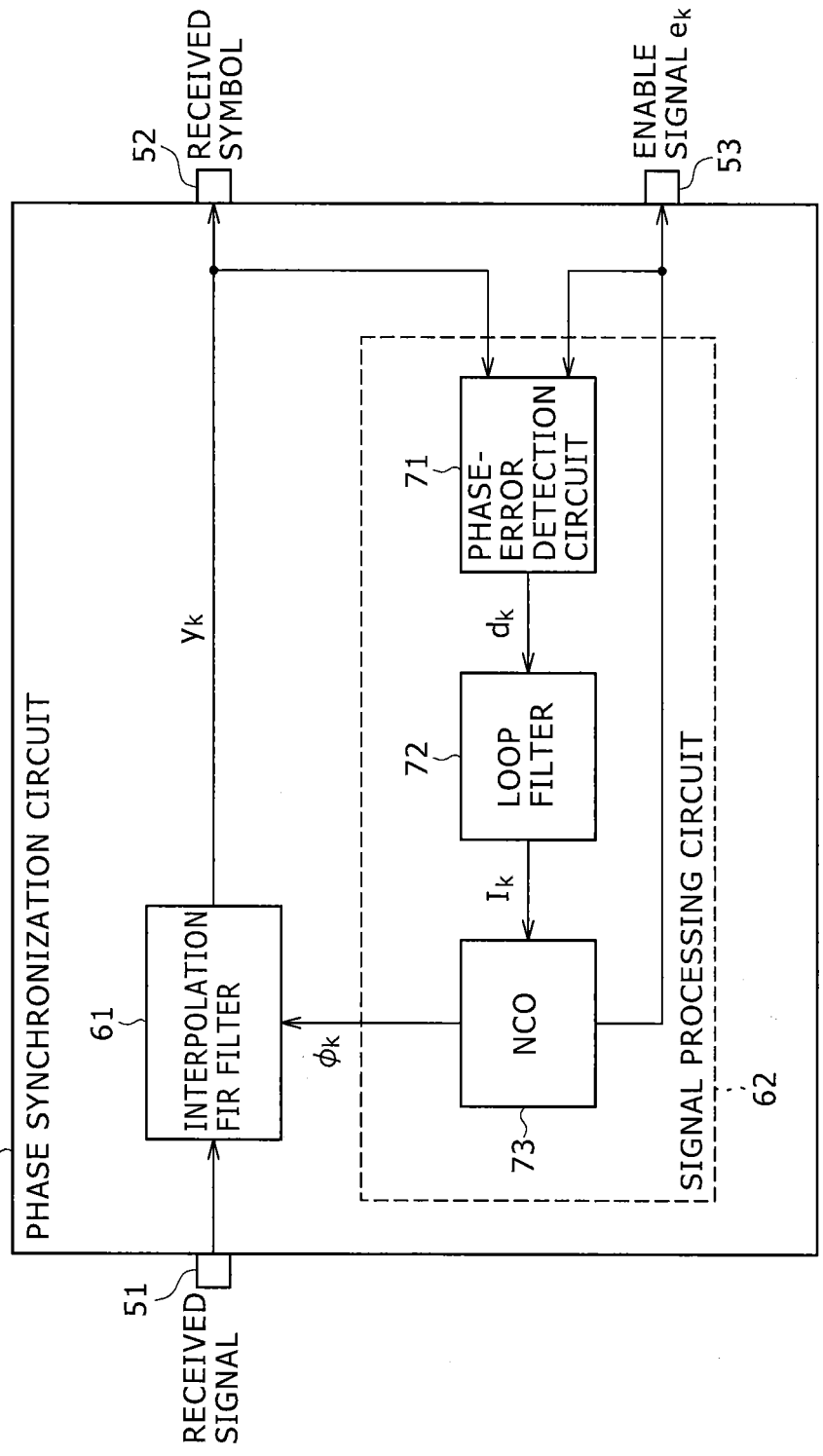
FIG. 2 is a block diagram showing a typical configuration of a phase synchronization circuit.
Figure 3:
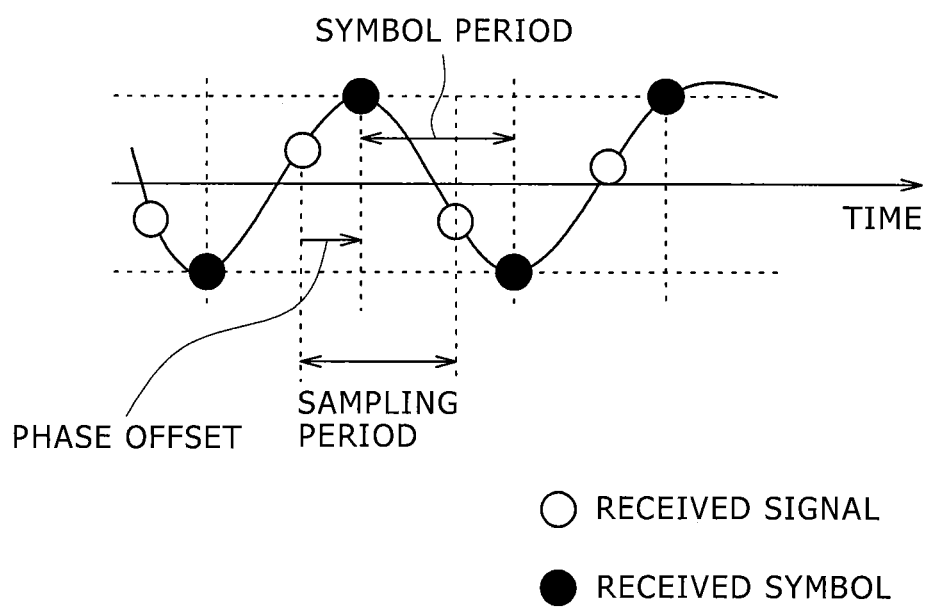
FIG. 3 is a diagram showing relations between an analog base band signal, received signals and received symbols.
Figure 4:
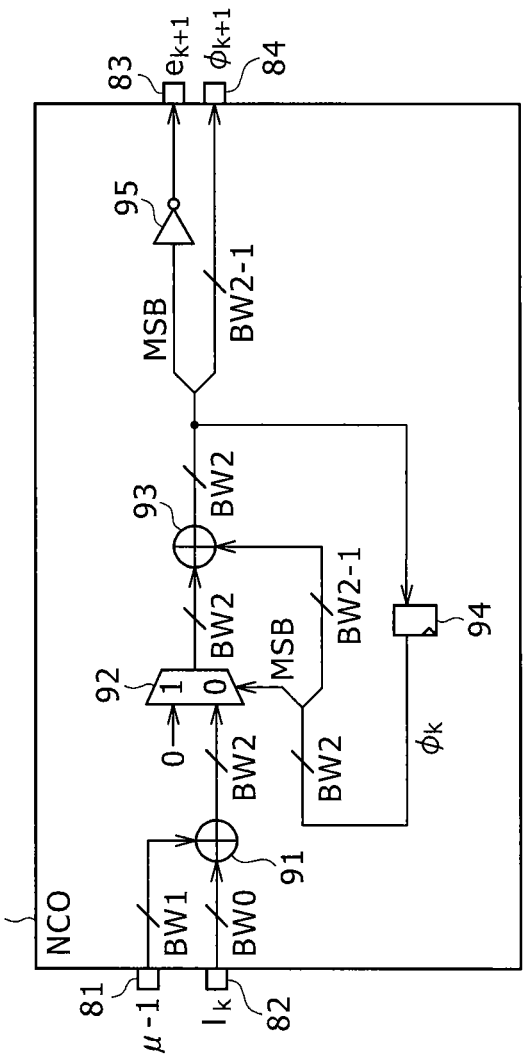
FIG. 4 is a diagram showing a typical configuration of an NCO shown in FIG. 2.
Figure 5:
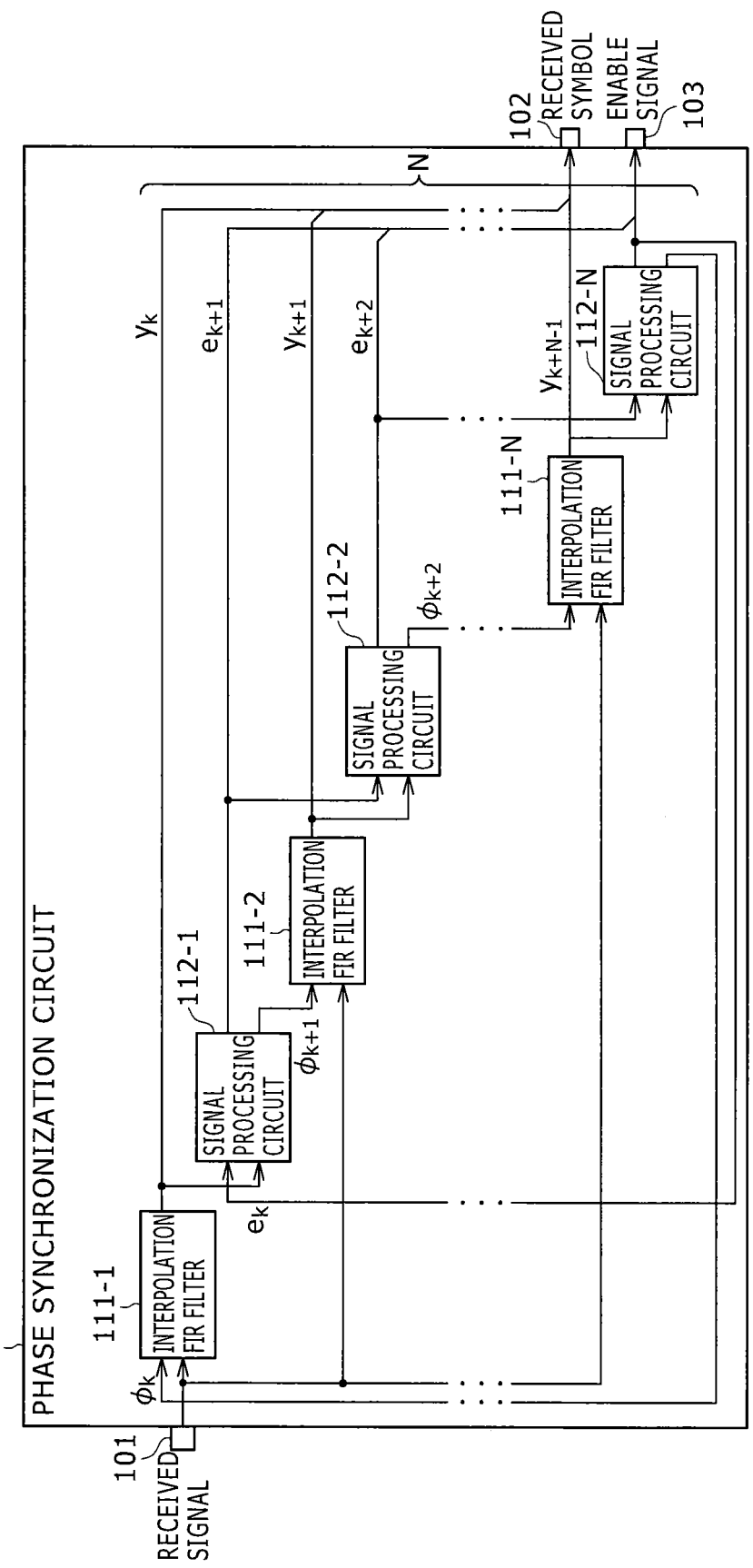
FIG. 5 is a diagram showing a typical configuration of an N-signals concurrent-processing phase synchronization circuit.
Figure 6:
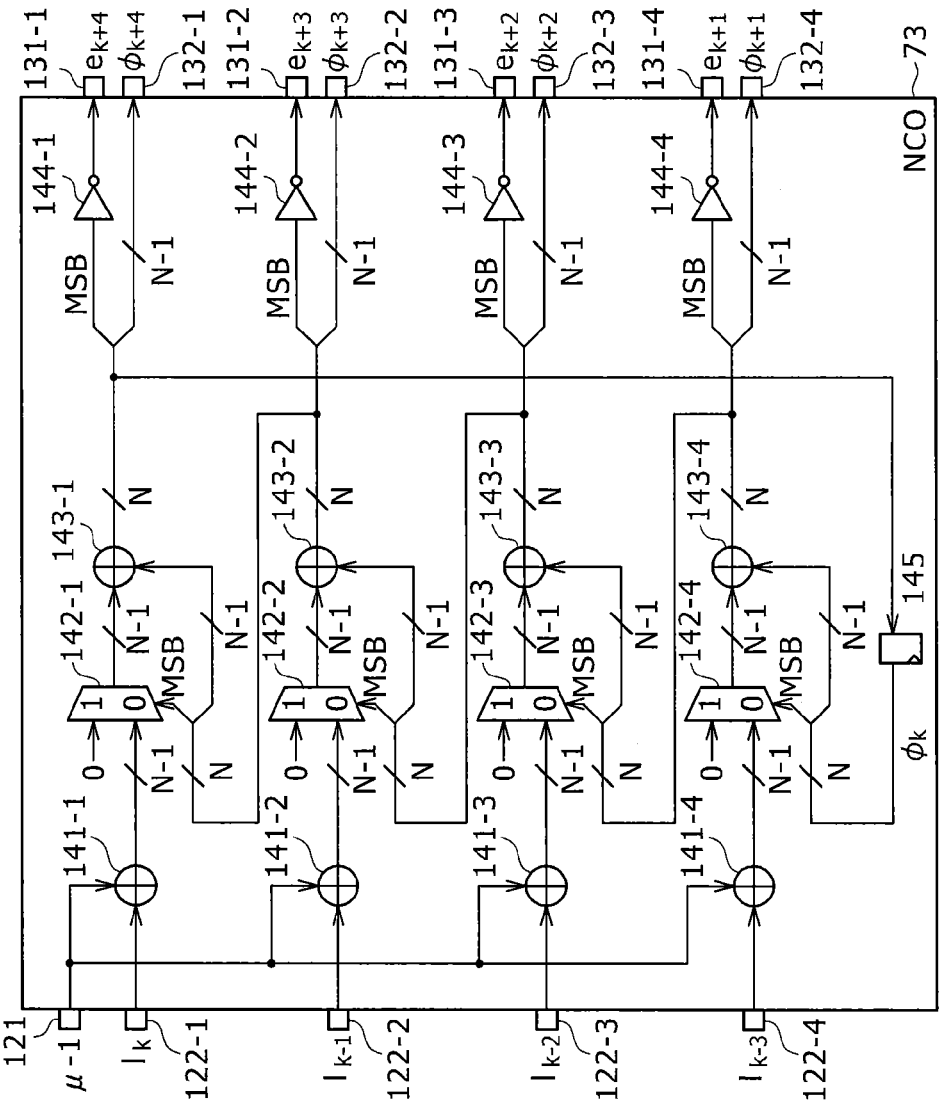
FIG. 6 is a diagram showing the circuit configuration of the NCO.
Figure 7:
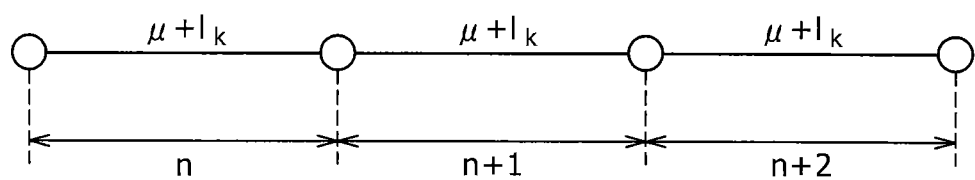
FIG. 7 is a diagram showing typical symbol intervals.

It is to be noted that no integration is carried out in the proportional term of Eq. (4) because the phase synchronization circuit 43 shown in FIG. 2 is a serial circuit as well as a circuit for carrying out serial processing on one received signal. On the other hand, the phase synchronization circuit 43 shown in FIG. 8 is a circuit for carrying out parallel processing on N received signals. Thus, the proportional term of Eq. (12) includes a term of integration of N phase errors.

On the other hand, the frequency-error correction value $m_{I,k}$ corresponds to the integral term $\mu K_I \Sigma d_i$ used in Eq. (4). The frequency-error correction value $m_{I,k}$ is used as a correction value dependent on the elapsed time. The frequency-error correction value $m_{I,k}$ is found by making use of Eq. (13) given as follows.

$$m_{I,k} = \mu\left(K_I \sum_{i=1}^{k} d_i\right) \quad (13)$$

The loop filter 213 supplies the phase-error correction value $m_{P,k}$ serving as the proportional term and the frequency-error correction value $m_{I,k}$ serving as the integral term to the NCO 214. In this way, the loop filter 213 supplies the phase-error correction value $m_{P,k}$ independent of the elapsed time and the frequency-error correction value $m_{I,k}$ dependent on the elapsed time to the NCO 214 separately from each other as correction values to be used for updating the phase offset. The loop filter 213 functions as a computation section for finding the phase-error correction value $m_{P,k}$ proportional to the sum of phase errors of N received signals and finding the frequency-error correction value $m_{I,k}$ proportional to the sum of phase errors of all received signals that have been received so far.

On the basis of the phase-error correction value $m_{P,k}$ and the frequency-error correction value $m_{I,k}$ which are received from the loop filter 213, the NCO 214 computes the phase offset $\Phi_{k+i}$ in accordance with Eq. (14) given below. In this case, notation i is an integer having a value in the following range: $1 \leq i < N$.

$$\Phi_{k+i} = \{\Phi_k + m_{P,k} + i \cdot (m_{I,k}+\mu) - i\} \bmod (\mu + m_{I,k}) \quad (14)$$

The NCO 214 outputs the phase offsets $\Phi_k, \ldots, \Phi_{k-N-2}$ and $\Phi_{k-N-1}$ to the interpolation FIR filter 211 in a batch operation. The NCO 214 functions as a computation section for updating the phase offset $\Phi_{k+i}$ with the value of the expression on the right hand side of Eq. (14). The value of the expression on the right hand side of Eq. (14) is obtained by:

adding the frequency-error correction value $m_{I,k}$ to the ratio $\mu (=T_s/T_p)$ in order to produce a sum $(m_{I,k}+\mu)$;

multiplying the integer i by the sum $(m_{I,k}+\mu)$ in order to produce a product $i \cdot (m_{I,k}+\mu)$;

adding a phase offset $\Phi_k$ to the phase-error correction value $m_{P,k}$ in order to produce a sum $(\Phi_k+m_{P,k})$;

adding the sum $(\Phi_k+m_{P,k})$ to the product $i \cdot (m_{I,k}+\mu)$ in order to produce a sum $\{\Phi_k+m_{P,k}+i \cdot (m_{I,k}+\mu)\}$;

subtracting the integer i from the sum $\{\Phi_k+m_{P,k}+i \cdot (m_{I,k}+\mu)\}$ in order to produce a difference $\{\Phi_k+m_{P,k}+i \cdot (m_{I,k}+\mu)-i\}$;

dividing the difference $\{\Phi_k+m_{P,k}+i \cdot (m_{I,k}+\mu)-i\}$ by the sum $(m_{I,k}+\mu)$ in order to produce a remainder $[\{\Phi_k+m_{P,k}+i \cdot (m_{I,k}+\mu)-i\} \bmod (m_{I,k}+\mu)]$; and taking the remainder $[\{\Phi_k+m_{P,k}+i \cdot (m_{I,k}+\mu)-i\} \bmod (m_{I,k}+\mu)]$ as the phase offset $\Phi_{k+i}$.

In addition, the NCO 214 also computes enable signals $e_k, \ldots, e_{k-N-2}$ and $e_{k-N-1}$ for the received symbols $y_k, \ldots, y_{k-N-2}$ and $y_{k-N-1}$ respectively in accordance with Eq. (15) given below as output signals. That is to say, the NCO 214 outputs the enable signals $e_k, \ldots, e_{k-N-2}$ and $e_{k-N-1}$ to the phase-error detection circuit 212 as well as the enable-signal output terminal 203.

$$e_{k+i} = \begin{cases} 1, & \text{if } \phi_{k+i} < 1 \\ 0, & \text{else} \end{cases} \quad (15)$$

The algorithms expressed by Eqs. (14) and (15) are valid for any value of the positive integer N. These algorithms can be used for concurrently computing phase offsets and enable signals. As is obvious from Eq. (15), the value of the enable signal is set at 1 if the difference in phase between the inferred received symbol and the received signal has a value in a range corresponding to the sampling period $T_p$ satisfying the following relations: $0 \leq T_p < 1$.

For any value of the positive integer N, the enable-signal computation based on Eq. (15) can also be applied to a case in which Eq. (9) is used as an equation for computing the phase offset.

Figure 9:
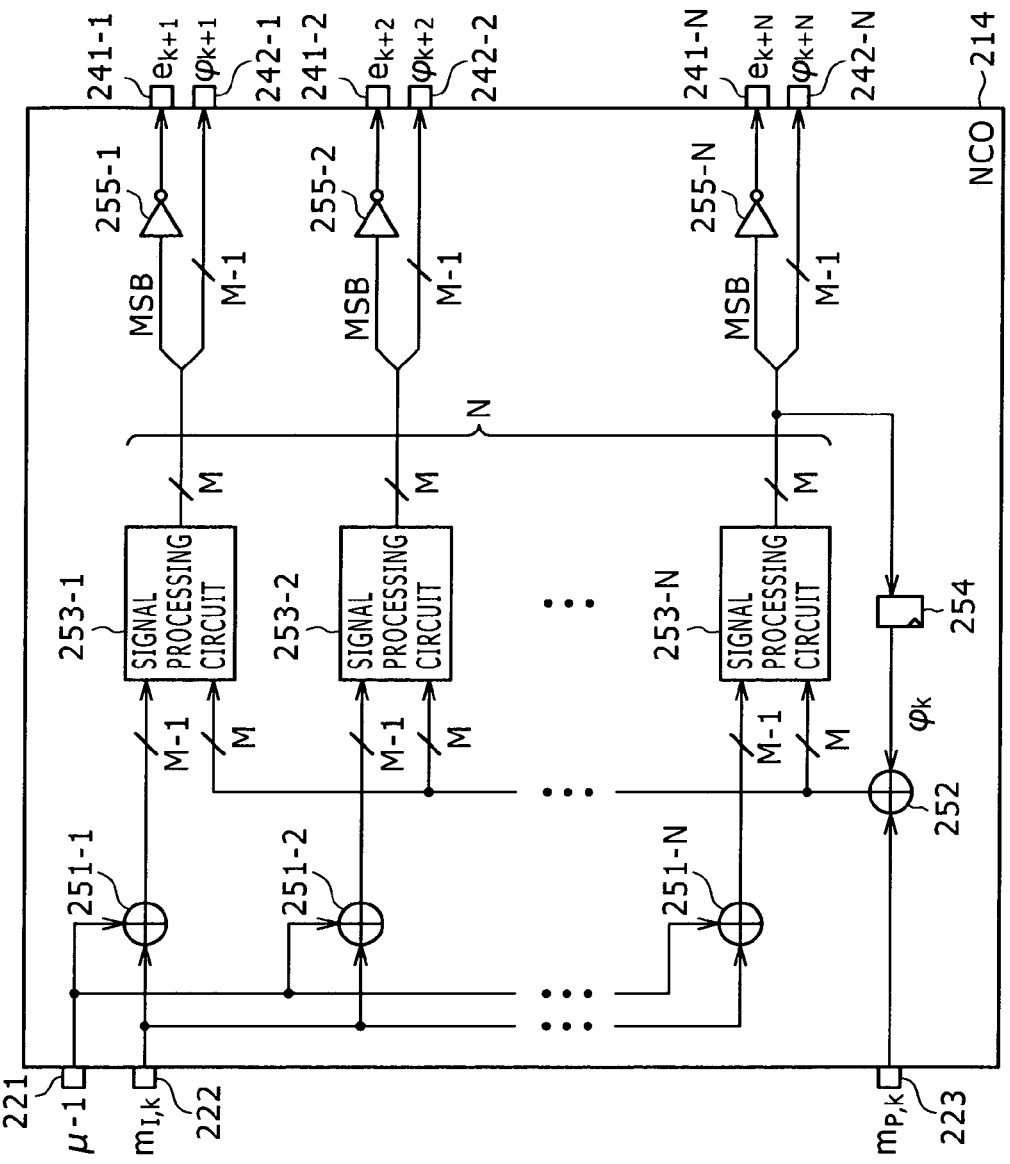
FIG. 9 is a diagram showing a typical configuration of an NCO shown in FIG. 8.

FIG. 9 is a diagram showing a typical circuit configuration of the NCO 214 employed in the phase synchronization circuit 43 shown in FIG. 8.

The frequency error correction value $m_{I,k}$ generated by the loop filter 213 is supplied to addition circuits 251-1 to 251-N by way of an input terminal 222. The addition circuits 251-1 to 251-N also receive the value of the expression ($\mu-1$) for the NCO 214 from an input terminal 221. On the other hand, the phase-error correction value $m_{P,k}$ is supplied to an addition circuit 252 by way of an input terminal 223.

Each of the addition circuits 251-1 to 251-N adds the frequency-error correction value $m_{I,k}$ to the value of the expression ($\mu-1$) in order to produce (M-1) bits representing the result of the addition operation. The addition results produced by the addition circuits 251-1 to 251-N are supplied to signal processing circuits 253-1 to 253-N respectively.

The addition circuit 252 adds the phase-error correction value $m_{P,k}$ to a phase offset $\Phi_k$ stored in a buffer 254 in order to produce M bits representing the result of the addition operation. The addition result produced by the addition circuit 252 is supplied to the signal processing circuits 253-1 to 253-N.

Setting the integer i at 1, the signal processing circuit 253-1 carries out processing according to Eq. (14) on the basis of the addition result produced by the addition circuit 251-1 and the addition result produced by the addition circuit 252 in order to produce M bits representing a remainder obtained as the result of the processing. In this case, the signal processing circuit 253-1 multiplies the addition result produced by the addition circuit 251-1 by the integer i in order to compute the value of the expression {i·($m_{I,k}+\mu)-i$} on the right hand side of Eq. (14). On the other hand, the addition result produced by the addition circuit 252 is the value of the expression ($\Phi_k + m_{P,k}$) on the right hand side of Eq. (14).

The most significant bit of the M bits generated by the signal processing circuit 253-1 is supplied to an inversion circuit 255-1. This inversion circuit 255-1 inverts the most significant bit in order to produce the enable signal $e_{k+1}$. The inversion circuit 255-1 supplies the enable signal $e_{k+1}$ to an enable-signal output terminal 241-1. On the other hand, the signal processing circuit 253-1 supplies the remaining (M-1) bits following the most significant bit of the M bits to a phase-offset output terminal 242-1 as the phase offset $\Phi_{k+1}$.

Setting the integer i at 2, the signal processing circuit 253-2 carries out the processing according to Eq. (14) on the basis of the addition result produced by the addition circuit 251-2 and the addition result produced by the addition circuit 252 in order to produce M bits representing a remainder obtained as the result of the processing.

The most significant bit of the M bits generated by the signal processing circuit 253-2 is supplied to an inversion circuit 255-2. The inversion circuit 255-2 inverts the most significant bit in order to produce the enable signal $e_{k+2}$. The inversion circuit 255-2 supplies the enable signal $e_{k+2}$ to an enable-signal output terminal 241-2. On the other hand, the signal processing circuit 253-2 supplies the remaining (M-1) bits following the most significant bit of the M bits to a phase-offset output terminal 242-2 as the phase offset $\Phi_{k+2}$.

In the same way, setting the integer i at N, the signal processing circuit 253-N carries out the processing according to Eq. (14) on the basis of the addition result produced by the addition circuit 251-N and the addition result produced by the addition circuit 252 in order to produce M bits representing a remainder obtained as the result of the processing.

The M bits output by the signal processing circuit 253-N are supplied to the buffer 254 to be stored in the buffer 254. The most significant bit of the M bits generated by the signal processing circuit 253-N is supplied to an inversion circuit 255-N. This inversion circuit 255-N inverts the most significant bit in order to produce the enable signal $e_{k+N}$. The inversion circuit 255-N supplies the enable signal $e_{k+N}$ to an enable-signal output terminal 241-N. On the other hand, the signal processing circuit 253-N supplies the remaining (M-1) bits following the most significant bit of the M bits to a phase-offset output terminal 242-N as the phase offset $\Phi_{k+N}$.

It is possible to provide a configuration in which the value of the enable signal is set at 1 if the difference in phase between the inferred received symbol and the received signal has a value in a range corresponding to the sampling period $T_p$ satisfying the following relations: $-1 < T_p \leq 0$. In such a configuration, the phase offset $\Phi'_{k+1}$ is found in accordance with Eq. (16) given below whereas the enable signal $e_{k+1}$ is found in accordance with Eq. (17) given as follows.

$$\phi'_{k+i} = (\phi'_k + i - m_{P,k}) \mod(\mu + m_{I,k}) \quad (16)$$

$$e_{k+i} = \begin{cases} 1, & \text{if } \phi'_{k+i} < 1 \\ 0, & \text{else} \end{cases} \quad (17)$$

The NCO 214 is configured to find the phase offset $\Phi'_{k+1}$ in accordance with Eq. (16) given above and the enable signal $e_{k+1}$ in accordance with Eq. (17) also given above.

Figure 10:
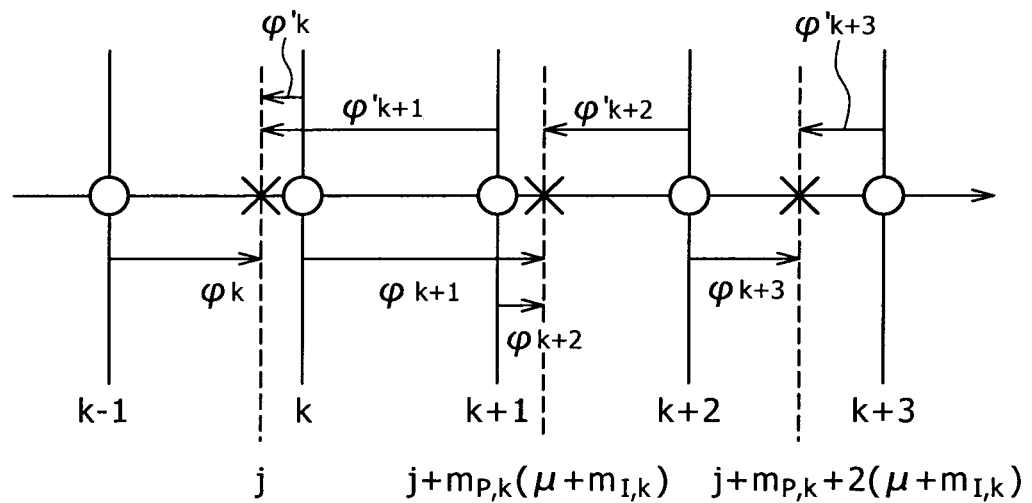
FIG. 10 is a diagram showing relations among the phases of a received signal, a received symbol, a phase offset, a phase-error correction value and a frequency-error correction value.

FIG. 10 is a diagram showing relations among the phases of the received signal, the received symbol, the phase offset, the phase-error correction value and the frequency-error correction value.

The horizontal axis of FIG. 10 represents the phase. Each white circle represents the phase of a received signal whereas each x mark represents the phase of a received symbol. Reference notation $\Phi_k$ denotes a phase difference oriented in the positive direction from a received signal to an inferred received symbol. Reference notation $\Phi'_k$ denotes a phase difference oriented in the opposite direction from a received signal to an inferred received symbol.

In addition, it is possible to provide a configuration in which the enable signal $e_{k+1}$ is updated on the basis of a real number a and the phase offset $\Phi_{k+i}$ in accordance with Eq. (18) or (19) given below. For this configuration, the real number a has a value in the range $-1 \leq a \leq 0$.

$$e_{k+i} = \begin{cases} 1, & \text{if } a < \phi_{k+i} \leq 1 + a \\ 0, & \text{else} \end{cases} \quad (18)$$

$$e_{k+i} = \begin{cases} 1, & \text{if } a \leq \phi_{k+i} < 1 + a \\ 0, & \text{else} \end{cases} \quad (19)$$

If the enable signal $e_{k+1}$ found in accordance with Eq. (18) or (19) given above is also supplied to the interpolation FIR filter 211 for example, the interpolation FIR filter 211 carries out the interpolation processing on the received signal only if the value of the enable signal $e_{k+1}$ indicates 1, the interpolation processing is to be carried out.

That is to say, with the enable signal $e_{k+1}$ found in accordance with Eq. (19) for example, the interpolation processing is carried out only if the phase offset $\Phi_{k+i}$ is at least equal to the real number a (a time period Tr satisfying the relations ($-T_p \leq T_r \leq 0$)) but the phase offset $\Phi_{k+i}$ is smaller than (1+a), that is, ($T_p + T_r$). With the enable signal $e_{k+1}$ found in accordance with Eq. (18), on the other hand, the interpolation processing is carried out only if the phase offset $\Phi_{k+i}$ greater than the real number a but the phase offset $\Phi_{k+i}$ is not greater than (1+a).

Operations of the Signal Receiving Apparatus

Figure 11:
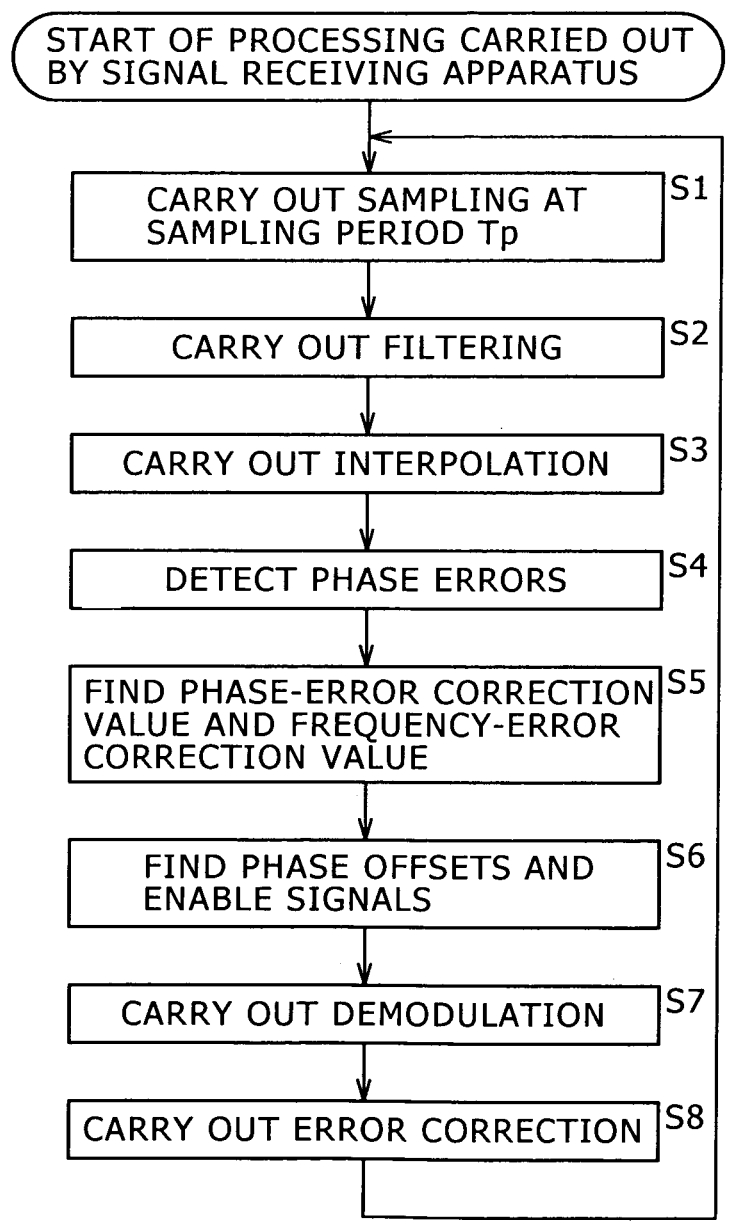
FIG. 11 shows a flowchart representing processing carried out by the signal receiving apparatus according to the embodiment.

Next, by referring to a flowchart shown in FIG. 11, the following description explains processing carried out by the signal receiving apparatus 2 employing the phase synchronization circuit 43 shown in FIG. 8.

The processing represented by the flowchart shown in FIG. 11 is started when the receiving-side RF circuit 32 supplies an analog base band signal to the A/D converter 41. Every step of the processing represented by the flowchart shown in FIG. 11 can properly be carried out concurrently with other steps of the processing, or the steps of the processing can be carried out in an order properly changed from the order indicated by the flowchart.

At a step S1, the A/D converter 41 samples the analog base band signal, which is received from the receiving-side RF circuit 32, at a sample period $T_p$.

At a step S2, the receiving-side filter 42 filters the received signal, which is supplied thereto by the A/D converter 41.

At a step S3, the interpolation FIR filter 211 employed in the phase synchronization circuit 43 carries out interpolation processing on the received signals, by making use of phase offsets each received from the NCO 214 for one of the received signals. The interpolation FIR filter 211 carries out the interpolation processing in order to generate M received symbols from N received signals.

At a step S4, on the basis of the received symbols output by the interpolation FIR filter 211 and enable signals output by the NCO 214, the phase-error detection circuit 212 detects phase errors of the received signals each associated with one of the received symbols and one of the enable signals.

At a step S5, on the basis of the phase errors detected by the phase-error detection circuit 212, the loop filter 213 finds a phase-error correction value $m_{P,k}$ in accordance with Eq. (12) and a frequency-error correction value $m_{I,k}$ in accordance with Eq. (13).

At a step S6, on the basis of the phase-error correction value $m_{P,k}$ and the frequency-error correction value $m_{I,k}$ which are received from the loop filter 213, the NCO 214 finds a phase offset $\Phi_{k+1}$ in accordance with Eq. (14) and an enable signal in accordance with Eq. (15). Then, the NCO 214 outputs phase offsets $\Phi_k, \ldots, \Phi_{k-N-2}$ and $\Phi_{k-N-1}$ to the interpolation FIR filter 211 as well as enable signals $e_k, \ldots, e_{k-N-2}$ and $e_{k-N-1}$.

At a step S7, the demodulation circuit 44 demodulates the received symbols in order to produce received data and supplies the received data to the error correction code decoding circuit 45.

At a step S8, the error correction code decoding circuit 45 carries out error correction processing on the received data and outputs error-free received data obtained as a result of the error correction processing to an external data recipient. Then, the flow of the processing carried out by the signal receiving apparatus 2 goes back to the step S1 in order to repeat the processing.

By carrying out the processing represented by the flowchart shown in FIG. 11, an N-signals concurrent-processing phase synchronization circuit is capable of concurrently finding N phase offsets and N enable signals where N is any arbitrary integer having a value not smaller than 2.

Simulation Results

Next, the following description explains simulation results obtained by execution of phase synchronization processing according to the present technique. To be more specific, the following description explains simulation results obtained from phase synchronization processing carried out on received signals by making use of phase offsets updated by the NCO 214 having the circuit configuration shown in FIG. 9.

Figure 12:
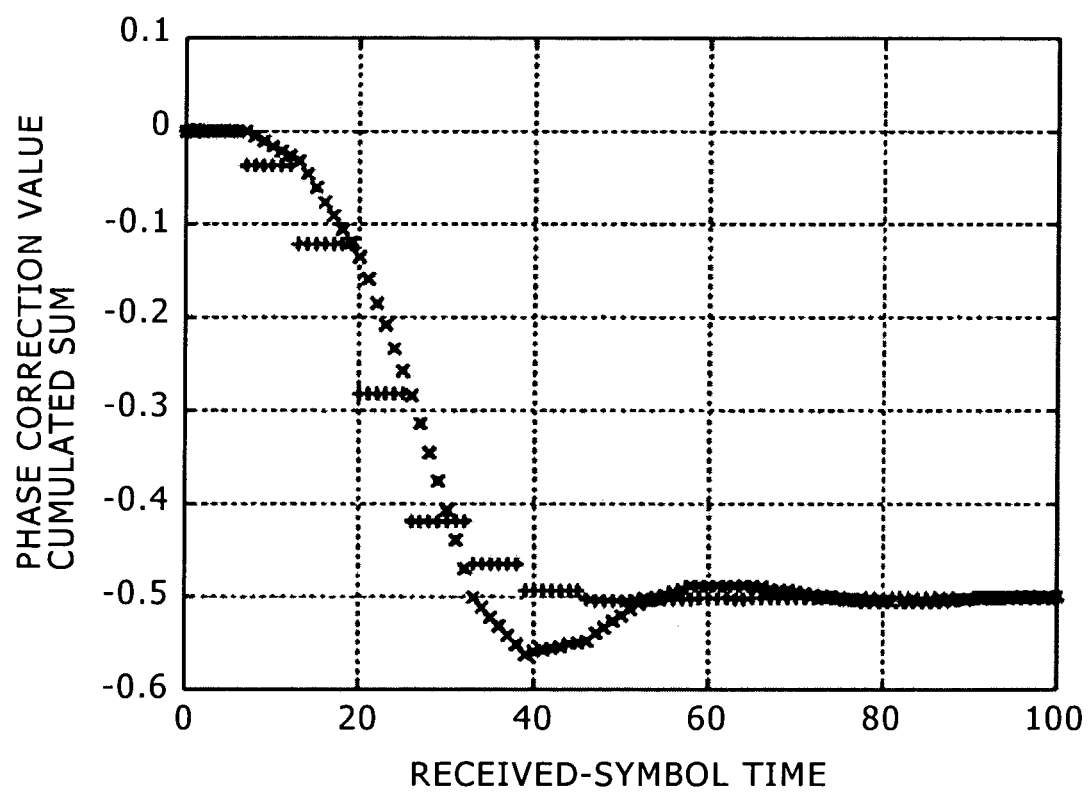
FIG. 12 shows simulation results.

FIG. 12 shows graphs each plotted to represent the cumulated value of the phase correction value (that is, the phase offset) for every point of time. The graph is obtained by providing an initial phase error of 0.5, which is a value normalized by the sampling period $T_p$, in a state of no frequency errors.

The horizontal axis of FIG. 12 represents received-symbol times whereas the vertical axis thereof represents the cumulative sum of the phase-error correction value. Each cross mark x shows a result of the phase synchronization processing based on the technology disclosed in Patent Document 2, that is, a result of the phase synchronization processing based on the existing technique. On the other hand, every + mark shows a result of the phase synchronization processing based on the present technique.

The time it takes to follow the initial phase error is the time it takes to converge the cumulative sum of the phase-error correction value to −0.5. As shown in FIG. 12, by carrying out the phase synchronization processing based on the present technique, the cumulative sum of the phase-error correction value converges at the 45th received-symbol period. By carrying out the phase synchronization processing based on the existing technique, on the other hand, the cumulative sum of the phase-error correction value converges at the 90th received-symbol period. In other words, in accordance with the present technique, the time it takes to converge the cumulative sum of the phase-error correction value is about half the time it takes to converge the cumulative sum of the phase-error correction value by adoption of the existing technique. That is to say, it is obvious that the performance to follow the initial phase error is improved.

It is to be noted that the cumulative sum of the phase-error correction value does not change continuously in FIG. 12 in the case of execution of the phase synchronization processing based on the present technique. The fact that the cumulative sum of the phase-error correction value does not change continuously indicates that the phase offset is updated to change instantaneously on the basis of the phase-error correction value $m_{P,k}$ output by the loop filter 213 to serve as the proportional term.

Figure 13:
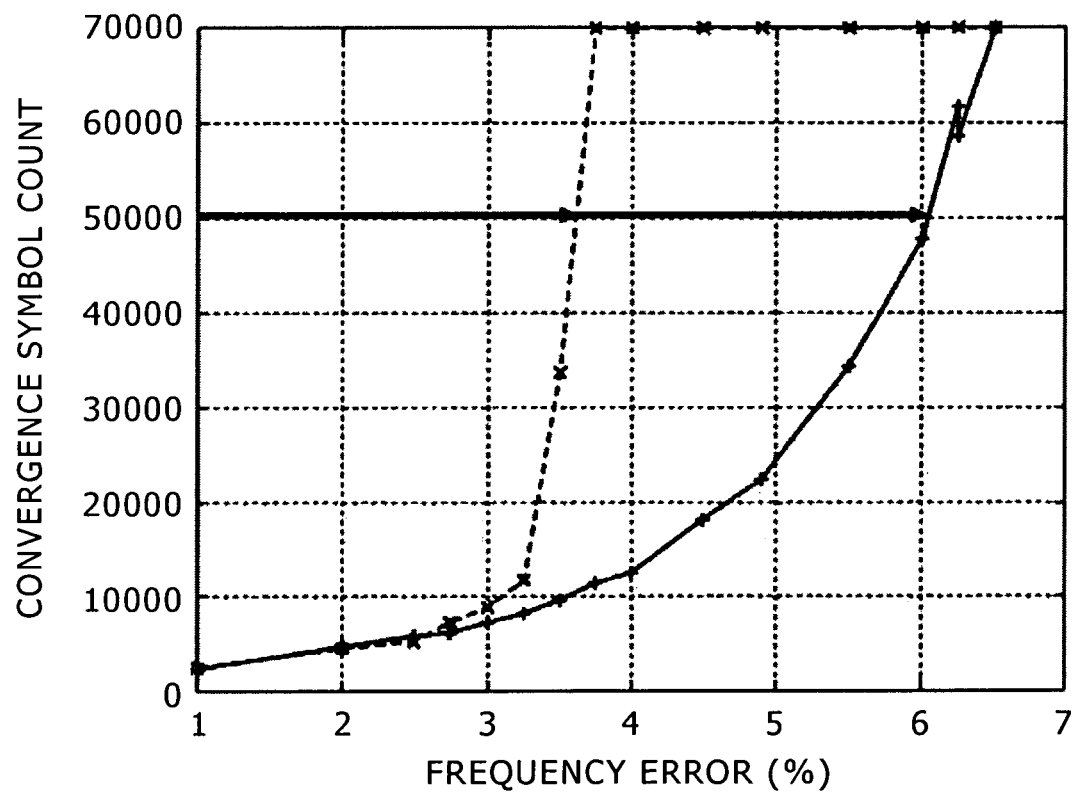
FIG. 13 shows simulation results.

FIG. 13 is a diagram showing graphs each representing the performance to follow a frequency error.

The horizontal axis of FIG. 13 represents the frequency error whereas the vertical axis thereof represents a convergence symbol count n indicating the number of symbols demanded till convergence. The convergence symbol count n is the number of symbols demanded till the output values of 2n received symbols following the nth received symbol fall into a range within 20% from the correct value of the received symbol.

The reader is requested to pay attention to a range of frequency errors for which convergence can be achieved within 50,000 symbols. In this case, the range of frequency errors for which the convergence can be achieved by adoption of the existing technique is a range of 3.6%. On the other hand, the range of frequency errors for which the convergence can be achieved by adoption of the present technique is a range of 6.1%. Thus, the range of frequency errors for which the convergence can be achieved by adoption of the present technique is greater by about 69% than the range of frequency errors for which the convergence can be achieved by adoption of the existing technique.

As described above, the phase synchronization circuit 43 shown in FIG. 8 to serve as an N-signals concurrent-processing phase synchronization circuit is capable of correcting the phases of received signals, which have been sampled at sampling periods asynchronous with the symbol periods, by carrying out N-signals concurrent processing. Thus, the phase can be synchronized at a higher speed.

In the above descriptions, the phase synchronization circuit 43 shown in FIG. 8 is employed in the signal receiving apparatus 2 of a radio communication system. However, the phase synchronization circuit 43 may also be employed in a reproduction apparatus for reproducing data from a recording medium on which the data has been recorded by a recording apparatus.

Computer Typical Configuration

The series of processes in the processing described previously can be carried out by hardware and/or execution of software. If the series of processes is carried out by execution of software, programs composing the software can be installed into a computer embedded in dedicated hardware, a general-purpose personal computer or the like from typically a network or a removable recording medium. A general-purpose personal computer is a personal computer, which can be made capable of carrying out a variety of functions by installing a variety of programs into the personal computer.

Figure 14:
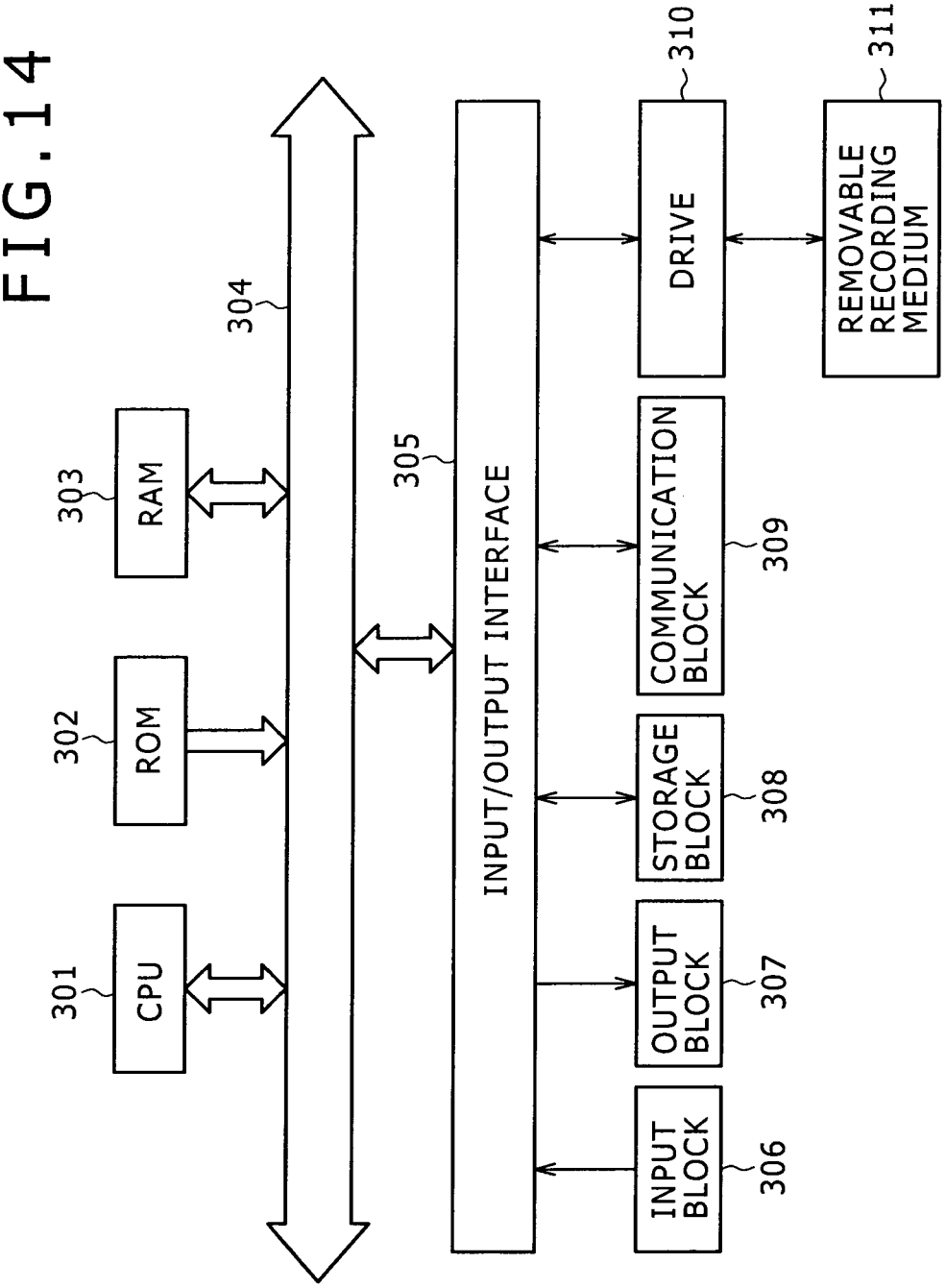
FIG. 14 is a block diagram showing a typical configuration of a computer.

FIG. 14 is a block diagram showing a typical hardware configuration of the computer for executing the programs in order to carry out the series of processes described above.

A CPU (Central Processing Unit) 301, a ROM (Read Only Memory) 302 and a RAM (Random Access Memory) 303 are connected to each other by a bus 304.

The bus 304 is also connected to an input/output interface 305. The input/output interface 305 is connected to an input block 306, an output block 307, a storage block 308 and a communication block 309. The input block 306 includes a keyboard and a mouse whereas the output block 307 includes a display unit and a speaker. The storage block 308 is typically a hard disk or a nonvolatile memory. The communication block 309 is typically a network interface. The input/output interface 305 is also connected to a drive 310 on which the removable recording medium 311 is mounted to be driven by the drive 310.

In the computer having the configuration described above, the CPU 301 loads a program stored in advance in the storage block 308 into the RAM 303 through the input/output interface 305 and the bus 304 and executes the program in order to carry out the series of processes described above.

The program stored in advance in the storage block 308 has been installed typically from the removable recording medium 311 or a program provider. In an operation to install the program from a program provider into the computer and store the program in the storage block 308, the program provider downloads the program through a wire or radio communication medium. A typical example of the wire communication medium is a local area network or the Internet whereas a typical example of the radio communication medium is a digital broadcasting communication medium.

It is to be noted that the program executed by the computer is typically a program configured for execution to carry out the processes of the processing along the time axis in accordance with an order explained in this technology specification. As an alternative, the program can be a program to be executed for carrying out the processes of the processing concurrently or with timings demanded on an as-invoked basis.

Implementations of the present technology are by no means limited to the embodiments described above. That is to say, the embodiments described above can be changed in a variety of ways into any other embodiments as long as the other embodiments fall within a range not deviating from essentials of the present technology.

The present disclosure contains subject matter related to that disclosed in Japanese Priority Patent Application JP 2010-125235 filed in the Japan Patent Office on May 31, 2010, the entire content of which is hereby incorporated by reference.

What is claimed is:

1. A phase synchronization apparatus comprising:

a sampling section configured to carry out discrete sampling processing at a sampling period $T_p$ on an analog base band signal representing data received from an apparatus other than the phase synchronization apparatus;

a phase-error detection section configured to detect phase errors which are phase differences between phases of N received signals and phases of M inferred received signals, the phases of N received signals being obtained as a result of said discrete sampling processing and the phases of M inferred received symbols having a symbol period $T_s$ where N is an integer at least equal to 2 whereas M is an integer neither smaller than 0 nor greater than said integer N;

a first computation section configured to find a phase-error correction value $m_{P,k}$ and a frequency-error correction value $m_{I,k}$ for a time k, the phase-error correction value $m_{P,k}$ being proportional to a sum of phase errors of said N received signals and the frequency-error correction value $m_{I,k}$ being proportional to a sum of phase errors through the time k;

a second computation section configured to find a phase offset $\Phi_{k+i}$ representing a correction quantity for the phase of each of said N received signals (where i is an integer at least equal to 1 but not greater than said integer N) by adding said frequency-error correction value $m_{I,k}$ found by said first computation section to a ratio $\mu(=T_s/T_p)$ in order to produce a sum $(m_{I,k}+\mu)$, multiplying said integer i by said sum $(m_{I,k}+\mu)$ in order to produce a product $i \cdot (m_{I,k}+\mu)$, adding a phase offset $\Phi_k$ to said phase-error correction value $m_{P,k}$ found by said first computation section in order to produce a sum $(\Phi_k+m_{P,k})$, adding said sum $(\Phi_k+m_{P,k})$ to said product $i \cdot (m_{I,k}+\mu)$ in order to produce a sum $\{\Phi_k+m_{P,k}+i \cdot (m_{I,k}+\mu)\}$, subtracting said integer i from said sum $\{\Phi_k+m_{P,k}+i \cdot (m_{I,k}+\mu)\}$ in order to produce a difference $\{\Phi_k+m_{P,k}+i \cdot (m_{I,k}+\mu)-i\}$, dividing said difference $\{\Phi_k+m_{P,k}+i \cdot (m_{I,k}+\mu)-i\}$ by said sum $(m_{I,k}+\mu)$ in order to produce a remainder $[\{\Phi_k+m_{P,k}+i \cdot (m_{I,k}+\mu)-i\} \bmod (m_{I,k}+\mu)]$, and taking said remainder $[\{\Phi_k+m_{P,k}+i \cdot (m_{I,k}+\mu)-i\} \bmod (m_{I,k}+\mu)]$ as said phase offset $\Phi_{k+i}$; and an interpolation section configured to find M received symbols from said N received signals at each of times $N \cdot T_p$ in a batch operation by carrying out interpolation processing on the basis of said phase offset $\Phi_{k+i}$ found by said second computation section.

2. The phase synchronization apparatus according to claim 1 wherein said interpolation section is driven to correct said phases of said received signals if said phase offset $\Phi_{k+i}$ found by said second computation section is a correction quantity corresponding to a period not shorter than a period $T_r$ satisfying the relation $-T_p \leq T_r \leq 0$ but shorter than a period phase-error correction value $m_{P,k}$ of $(T_r+T_p)$, that is, if said phase offset $\Phi_{k+i}$ found by said second computation section is a correction quantity corresponding to a period longer than said period $T_r$ but not longer than said period of $(T_r+T_p)$.

3. A phase synchronization method comprising:
carrying out discrete sampling processing at a sampling period $T_p$ on an analog base band signal representing data received from an apparatus;
detecting phase errors which are phase differences between phases of N received signals and phases of M inferred received symbols, the phases of N received signals being obtained as a result of said discrete sampling processing and the phases of M inferred received symbols having a symbol period $T_s$ where N is an integer at least equal to 2 whereas M is an integer neither smaller than 0 nor greater than said integer N;
finding a phase-error correction value $m_{P,k}$ and a frequency-error correction value $m_{I,k}$ for a time k, the phase-error correction value $m_{P,k}$ being proportional to a sum of phase errors of said N received signals and the frequency-error correction value $m_{I,k}$ being proportional to a sum of phase errors through the time k;
finding a phase offset $\Phi_{k+i}$ representing a correction quantity for the phase of each of said N received signals (where i is an integer at least equal to 1 but not greater than said integer N) by
adding said found frequency-error correction value $m_{I,k}$ to a ratio $\mu(\equiv T_s/T_p)$ in order to produce a sum $(m_{I,k}+\mu)$,
multiplying said integer i by said sum $(m_{I,k}+\mu)$ in order to produce a product $i \cdot (m_{I,k}+\mu)$,
adding a phase offset $\Phi_k$ to said found phase-error correction value $m_{P,k}$ in order to produce a sum $(\Phi_k+m_{P,k})$,
adding said sum $(\Phi_k+m_{P,k})$ to said product $i \cdot (m_{I,k}+\mu)$ in order to produce a sum $\{\Phi_k+m_{P,k}+i \cdot (m_{I,k}+\mu)\}$,
subtracting said integer i from said sum $\{\Phi_k+m_{P,k}+i \cdot (m_{I,k}+\mu)\}$ in order to produce a difference $\{\Phi_k+m_{P,k}+i \cdot (m_{I,k}+\mu)-i\}$,
dividing said difference $\{\Phi_k+m_{P,k}+i \cdot (m_{I,k}+\mu)-i\}$ by said sum $(m_{I,k}+\mu)$ in order to produce a remainder $[\{\Phi_k+m_{P,k}+i \cdot (m_{I,k}+\mu)-i\} \bmod (m_{I,k}+\mu)]$, and
taking said remainder $[\{\Phi_k+m_{P,k}+i \cdot (m_{I,k}+\mu)-i\} \bmod (m_{I,k}+\mu)]$ as said phase offset $\Phi_{k+i}$; and
finding M received symbols from said N received signals at each of times $N \cdot T_p$ in a batch operation by carrying out interpolation processing on the basis of said found phase offset $\Phi_{k+i}$.

4. A non-transitory computer readable medium that stores a phase synchronization program executable by a computer to carry out processing including:
carrying out discrete sampling processing at a sampling period $T_p$ on an analog base band signal representing data received from an apparatus;
detecting phase errors which are phase differences between phases of N received signals and phases of M inferred received symbols, the phases of N received signals being obtained as a result of said discrete sampling processing and the phases of M inferred received symbols having a symbol period $T_s$ where N is an integer at least equal to 2 whereas M is an integer neither smaller than 0 nor greater than said integer N;
finding a phase-error correction value $m_{P,k}$ and a frequency-error correction value $m_{I,k}$ for a time k, the phase-error correction value $m_{P,k}$ being proportional to a sum of phase errors of said N received signals and the frequency-error correction value $m_{I,k}$ being proportional to a sum of phase errors through the time k,
finding a phase offset $\Phi_{k+i}$ representing a correction quantity for the phase of each of said N received signals (where i is an integer at least equal to 1 but not greater than said integer N) by
adding said found frequency-error correction value $m_{I,k}$ to a ratio $\mu(\equiv T_s/T_p)$ in order to produce a sum $(m_{I,k}+\mu)$,
multiplying said integer i by said sum $(m_{I,k}+\mu)$ in order to produce a product $i \cdot (m_{I,k}+\mu)$,
adding a phase offset $\Phi_k$ to said found phase-error correction value $m_{P,k}$ in order to produce a sum $(\Phi_k+m_{P,k})$,
adding said sum $(\Phi_k+m_{P,k})$ to said product $i \cdot (m_{I,k}+\mu)$ in order to produce a sum $\{\Phi_k+m_{P,k}+i \cdot (m_{I,k}+\mu)\}$,
subtracting said integer i from said sum $\{\Phi_k+m_{P,k}+i \cdot (m_{I,k}+\mu)\}$ in order to produce a difference $\{\Phi_k+m_{P,k}+i \cdot (m_{I,k}+\mu)-i\}$,
dividing said difference $\{\Phi_k+m_{P,k}+i \cdot (m_{I,k}+\mu)-i\}$ by said sum $(m_{I,k}+\mu)$ in order to produce a remainder $[\{\Phi m_{P,k}+i \cdot (m_{I,k}+\mu)-i\} \bmod (m_{I,k}+\mu)]$, and
taking said remainder $[\{\Phi_k+m_{P,k}+i \cdot (m_{I,k}+\mu)-i\} \bmod (m_{I,k}+\mu)]$ as said phase offset $\Phi_{k+i}$; and
finding M received symbols from said N received signals at each of times $N \cdot T_p$ in a batch operation by carrying out interpolation processing on the basis of said found phase offset $\Phi_{k+i}$.

5. A phase synchronization apparatus comprising:
a sampling section configured to carry out discrete sampling processing at a sampling period $T_p$ on an analog base band signal representing data received from an apparatus other than the base synchronization apparatus;
a phase-error detection section configured to detect phase errors which are phase differences between phases of N received signals and phases of M inferred received symbols, the phases of N received signals being obtained as a result of said discrete sampling processing and the phases of M inferred received symbols having a symbol period $T_s$ where N is an integer at least equal to 2 whereas M is an integer neither smaller than 0 nor greater than said integer N;
a first computation section configured to find a phase-error correction value $m_{P,k}$ and a frequency-error correction value $M_{I,k}$ for a time k, the phase-error correction value $m_{P,k}$ being proportional to a sum of phase errors of said N received signals and the frequency-error correction value $m_{I,k}$ being proportional to a sum of phase errors through the time k;
a second computation section configured to find a phase offset $\Phi_{k+i}$ representing a correction quantity for the phase of each of said N received signals (where i is an integer at least equal to 1 but not greater than said integer N) by
adding said integer i to a phase offset $\Phi_k$ in order to produce a sum $(i+\Phi_k)$,
subtracting said phase-error correction value $m_{P,k}$ found by said first computation section from said sum $(i+\Phi_k)$ in order to produce a difference $(i+\Phi_k-m_{P,k})$,
adding said frequency-error correction value $m_{I,k}$ found by said first computation section to a ratio $\mu(\equiv T_s/T_p)$ in order to produce a sum $(m_{I,k}+\mu)$,
dividing said difference $(i+\Phi_k-m_{P,k})$ by said sum $(m_{I,k}+\mu)$ in order to produce a remainder $\{(i+\Phi_k-m_{P,k}) \bmod (m_{I,k}+\mu)\}$, and
taking said remainder $\{(i+\Phi_k-m_{P,k}) \bmod (m_{I,k}+\mu)\}$ as said phase offset $\Phi_{k+i}$; and
an interpolation section configured to find M received symbols from said N received signals at each of times $N \cdot T_p$ in a batch operation by carrying out interpolation processing on the basis of said phase offset $\Phi_{k+i}$ found by said second computation section.

6. A phase synchronization method comprising:

carrying out discrete sampling processing at a sampling period $T_p$ on an analog base band signal representing data received from an apparatus;

detecting phase errors which are phase differences between phases of N received signals and phases of M inferred received symbols, the phases of N received signals being obtained as a result of said discrete sampling processing and the phases of M inferred received symbols having a symbol period $T_s$ where N is an integer at least equal to 2 whereas M is an integer neither smaller than 0 nor greater than said integer N;

finding a phase-error correction value $m_{P,k}$ and a frequency-error correction value $m_{I,k}$ for a time k, the phase-error correction value $m_{P,k}$ being proportional to a sum of phase errors of said N received signals and the frequency-error correction value $m_{I,k}$ being proportional to a sum of phase errors through the time k;

finding a phase offset $\Phi_{k+i}$ representing a correction quantity for the phase of each of said N received signals (where i is an integer at least equal to 1 but not greater than said integer N) by adding said integer i to a phase offset $\Phi_k$ in order to produce a sum $(i+\Phi_k)$, subtracting said found phase-error correction value $m_{P,k}$ from said sum $(i+\Phi_k)$ in order to produce a difference $(i+\Phi_k-m_{P,k})$, adding said found frequency-error correction value $m_{I,k}$ to a ratio $\mu(\equiv T_s/T_p)$ in order to produce a sum $(m_{I,k}+\mu)$, dividing said difference $(i+\Phi_k-m_{P,k})$ by said sum $(m_{I,k}+\mu)$ in order to produce a remainder $\{(i+\Phi_k-m_{P,k}) \bmod (m_{I,k}+\mu)\}$, and taking said remainder $\{(i+\Phi_k-m_{P,k}) \bmod (m_{I,k}+\mu)\}$ as said phase offset $\Phi_{k+i}$; and finding M received symbols from said N received signals at each of times $N \cdot T_p$ in a batch operation by carrying out interpolation processing on the basis of said found phase offset $\Phi_{k+i}$.

7. A non-transitory computer readable medium that stores a phase synchronization program executable by a computer to carry out processing including:

carrying out discrete sampling processing at a sampling period $T_p$ on an analog base band signal representing data received from an apparatus;

detecting phase errors which are phase differences between phases of N received signals and phases of M inferred received symbols, the phases of N received signals being obtained as a result of said discrete sampling processing and the phases of M inferred received symbols having a symbol period $T_s$ where N is an integer at least equal to 2 whereas M is an integer neither smaller than 0 nor greater than said integer N;

finding a phase-error correction value $m_{P,k}$ and a frequency-error correction value $m_{I,k}$ for a time k, the phase-error correction value $m_{P,k}$ being proportional to a sum of phase errors of said N received signals and the frequency-error correction value $m_{I,k}$ being proportional to a sum of phase errors through time k;

finding a phase offset $\Phi_{k+i}$ representing a correction quantity for the phase of each of said N received signals (where i is an integer at least equal to 1 but not greater than said integer N) by adding said integer i to a phase offset $\Phi_k$ in order to produce a sum $(i+\Phi_k)$, subtracting said found phase-error correction value $m_{P,k}$ from said sum $(i+\Phi_k)$ in order to produce a difference $(i+\Phi_k-m_{P,k})$, adding said found frequency-error correction value $m_{I,k}$ to a ratio $\mu(\equiv T_s/T_p)$ in order to produce a sum $(m_{I,k}+\mu)$, dividing said difference $(i+\Phi_k-m_{P,k})$ by said sum $(m_{I,k}+\mu)$ in order to produce a remainder $\{(i+\Phi_k-m_{P,k}) \bmod (m_{I,k}+\mu)\}$, and taking said remainder $\{(i+\Phi_k-m_{P,k}) \bmod (m_{I,k}+\mu)\}$ as said phase offset $\Phi_{k+i}$; and finding M received symbols from said N received signals at each of times $N \cdot T_p$ in a batch operation by carrying out interpolation processing on the basis of said found phase offset $\Phi_{k+i}$.

* * * * *